(12) United States Patent
Juneja et al.

(10) Patent No.: US 10,095,716 B1
(45) Date of Patent: Oct. 9, 2018

(54) METHODS, MEDIUMS, AND SYSTEMS FOR DATA HARMONIZATION AND DATA HARMONIZATION AND DATA MAPPING IN SPECIFIED DOMAINS

(71) Applicant: SAS Institute Inc., Cary, NC (US)

(72) Inventors: Sandeep Rajendra Juneja, Morrisville, NC (US); Nathan John Asselstine, Garner, NC (US); Preetesh Vijay Parikh, Morrisville, NC (US); Eric Emerton, Cary, NC (US); Kevin Ian Alderton, Raleigh, NC (US); Benedict Edward Bocchicchio, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/943,235

(22) Filed: Apr. 2, 2018

Related U.S. Application Data

(60) Provisional application No. 62/481,248, filed on Apr. 4, 2017, provisional application No. 62/480,502, filed on Apr. 2, 2017, provisional application No. 62/555,247, filed on Sep. 7, 2017.

(51) Int. Cl.
*G06F 17/30* (2006.01)
*G06F 17/27* (2006.01)

(52) U.S. Cl.
CPC .... *G06F 17/30303* (2013.01); *G06F 17/2735* (2013.01); *G06F 17/30339* (2013.01)

(58) Field of Classification Search
CPC ........... G06F 17/30303; G06F 17/2735; G06F 17/30339; G06F 17/30598; G06F 17/30705; G06F 17/30722; G06F 17/30707; G06F 17/3071
See application file for complete search history.

(56) References Cited

U.S. PATENT DOCUMENTS

| | | | |
|---|---|---|---|
| 6,367,037 B1 * | 4/2002 | Remer | G06F 11/3006 710/105 |
| 9,501,539 B2 * | 11/2016 | Joshi | G06F 17/30566 |
| 9,684,699 B2 | 6/2017 | DelGobbo et al. | |
| 9,740,757 B1 * | 8/2017 | Gilder | G06F 17/30563 |

(Continued)

OTHER PUBLICATIONS

"A Brief Introduction to CDISC-SDTM and Data Mapping", Anindita Bhattacharjee, May 3, 2010, Cytel Statistical Software & Services Pvt. Ltd, 34 pages.

(Continued)

*Primary Examiner* — Noosha Arjomandi

(57) ABSTRACT

The techniques described herein automatically and programmatically harmonize data, and map variable names from a dataset to standards of domains for data in the dataset. Each variable may be stored in a table which holds related groups of variables. The variables may be named by defining mappings, each mapping including two mapping rules. A first mapping rule maps a domain of the standard to the table, while a second mapping rule maps a variable within the table to a variable within the domain. When a mapping rule exists that provides an exact match between a variable name and a standard, an auto-mapping feature may be applied that automatically maps the variable name to the standard. If no exact match exists, then an analysis is performed to determine the most likely mapping candidate.

30 Claims, 25 Drawing Sheets

(56) References Cited

U.S. PATENT DOCUMENTS

| | | | | |
|---|---|---|---|---|
| 9,928,379 | B1* | 3/2018 | Hoffer | G06F 17/30864 |
| 2003/0182310 | A1* | 9/2003 | Charnock | G06F 17/30716 |
| 2009/0043753 | A1* | 2/2009 | Elango | G06F 17/3066 |
| 2010/0174753 | A1* | 7/2010 | Goranson | G06F 17/30817 |
| | | | | 707/791 |
| 2012/0191708 | A1* | 7/2012 | Barsony | G06Q 10/00 |
| | | | | 707/737 |
| 2012/0284259 | A1* | 11/2012 | Jehuda | G06F 17/30734 |
| | | | | 707/722 |
| 2013/0297347 | A1* | 11/2013 | Cardoza | G06F 19/322 |
| | | | | 705/3 |
| 2014/0079297 | A1* | 3/2014 | Tadayon | G06K 9/00 |
| | | | | 382/118 |
| 2014/0310243 | A1* | 10/2014 | McGee | G06F 17/30575 |
| | | | | 707/639 |
| 2015/0006491 | A1* | 1/2015 | He | G06F 17/30575 |
| | | | | 707/694 |
| 2016/0027049 | A1* | 1/2016 | Fatemi | G06Q 30/0255 |
| | | | | 705/14.53 |
| 2016/0070725 | A1* | 3/2016 | Marrelli | G06F 17/30303 |
| | | | | 707/692 |
| 2016/0110512 | A1* | 4/2016 | Adjaoute | G06Q 40/08 |
| | | | | 705/2 |
| 2016/0147798 | A1* | 5/2016 | Marrelli | G06F 17/30303 |
| | | | | 707/692 |
| 2016/0180245 | A1* | 6/2016 | Tereshkov | G06F 17/30557 |
| | | | | 706/12 |
| 2017/0199875 | A1* | 7/2017 | Nevrekar | G06F 17/3053 |

OTHER PUBLICATIONS

"Transferring Semantic Layer Metadata and Data", SAS Institute Inc., 5 pages.

Clinical Research Services—"Regulatory Submissions", Cytel, http://www.cytel.com/clinical-research-services/regulatory-submissions., 3 pages.

* cited by examiner

Study Setup

Additional Study Metadata

Data Standard / Controlled Terminology Association

Programming Association

Variables Mapping

FIG. 23

METHODS, MEDIUMS, AND SYSTEMS FOR DATA HARMONIZATION AND DATA HARMONIZATION AND DATA MAPPING IN SPECIFIED DOMAINS

RELATED APPLICATIONS

This application claims priority to U.S. Provisional Application Ser. No. 62/481,248, entitled "Data Mapper" and filed on Apr. 4, 2017; to U.S. Provisional Application Ser. No. 62/480,502 entitled "Data Mapper" and filed on Apr. 2, 2017; and to U.S. Provisional Application Ser. No. 62/555,247 entitled "Data Mapper" and filed on Sep. 7, 2017. The contents of the aforementioned application are incorporated herein by reference.

BACKGROUND

In many circumstances, data may be shared between different groups. The data may be stored as a collections of values for variables, each variable having a variable name. The variables may be named according to a standard that provides guidelines or naming conventions which should be followed across an industry or other group. For instance, the Food and Drug Administration (FDA) reviews data from pharmaceutical companies for regulatory purposes. In order to ensure that the FDA can understand the data, the FDA mandates that submitted data be formatted according to standards established by the Clinical Data Interchange Standards Consortium (CDISC).

Such standards typically need to be flexible to account for new or unforeseen types of data. However, this flexibility may leave naming conventions open to individual interpretation, which can result in the same types of data being given slightly different names across data sets. For instance, one pharmaceutical company may identify clinical subjects using the variable "SUBJID" (for "Subject Identifier"), while a second uses the variable "USUBJID" (for "Unique Subject Identifier").

Consequently, variable names may need to be harmonized before or after the data is reported. The process of harmonizing the variable names is often tedious, error prone, and time consuming.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

Exemplary embodiments provide techniques for automatically mapping raw data sources to a standard.

An identification of a standard may initially be received. The standard may define one or more domains, where a domain represents a defined dataset that contains a group of related variables (e.g., in a clinical trial, a "subject" domain might include variables such as age, gender, weight, height, etc.). The standard may represent a collection of recommended names for domain variables pertaining to data associated with each respective domain.

Exemplary embodiments may associate the standard with a collection of data. The collection of data may include one or more tables, each table including one or more data variables having respective variable names. The collection of data may be read into a memory of an electronic computing device.

The collection of data may be canonicalized. Canonicalization may involve, for example, removing empty records, converting the collection of data to a same letter case, combining columns in the collection of data, or filtering categories in the collection of data to remove categories having observation counts below a predetermined minimum threshold.

A first mapping of a selected table from the one or more tables to a specified domain of the one or more domains may be determined. A second mapping of a selected data variable name within the selected table to a specified domain variable name within the specified domain may also be determined.

Determining the first mapping and the second mapping may involve analyzing a name of the selected table and the selected data variable name to generate a plurality of n-grams of the selected table name and the selected data variable name. According to one embodiment, the n-grams may be applied with a value of n=2. The n-grams may be stored in a dictionary, which may be re-scaled based on an analysis of the n-grams. For instance, the dictionary may be re-scaled based on a term-frequency/inverse document frequency (TF-IDF) analysis.

A plurality of naming models may be evaluated to determine which of the plurality of models produces a highest weighted accuracy in mapping terms of the dictionary to terms of the standard, and the model with the highest weighted accuracy may be selected to map the data variable names. The weighted accuracy may be determined by determining a mapping defined by the selected mode. The mapping may match a variable name of the model to the selected data variable name. Based on the n-gram analysis, a mapping score may be determined that describes how closely the variable name of the model matches the selected data variable name. A number of studies using the mapping may be determined, and the mapping score may be weighted based on the number of studies.

The first mapping and the second mapping may be identified in the selected model. Based on the first mapping and the second mapping, a mapping rule may be defined. The mapping rule may optionally be stored in a library (e.g., as metadata in the library), and the mapping rules in the library may be accessed when predicting that the selected one of the new variables should be mapped to the specified variable name within the specified domain.

Subsequently, a new data set including one or more new tables may be received. The new tables may each include one or more new data variables having respective new variable names. The above-described mapping rule may be used to predict that a selected one of the new data variables should be mapped to the specified domain variable name within the specified domain based on one or more factors, such as: the new variable name of the selected one of the new data variables is identical to the selected domain variable name; or the new variable name matches the selected domain variable name within a predetermined threshold closeness value.

Optionally, code may be automatically generated for programmatically applying the mapping rule to a new data set. The code may be generated by defining a script that replaces the selected data variable name with the specified domain variable name.

In some embodiments, the mapping rule may be created by a first user. The new collection of data may be received from a second user different from the first user, and the mapping rule may be automatically applied to map data in the new collection to the standard when one or more variable names in the new collection exactly match one or more variable names defined in the mapping rule.

In further embodiments, at least one of the new variable names may be distinct from a variable name defined in the mapping rule. In this case, a degree of similarity between the new variable name and the variable name defined in the mapping rule may be determined. The mapping rule may be applied to the new variable name based on the determined degree of similarity. In another example in which least one of the new variable names is distinct from a variable name defined in the mapping rule, the mapping rule may be applied based on a frequency with which the mapping rule has been applied to map the new variable name to the variable name defined in the mapping rule.

According to some embodiments, a user interface may be presented when uncertainty exists regarding the correct mapping. The interface may present two or more options for specified variable names from the specified domain to which the selected variable name may be mapped. A selection of one of the two or more options may be received, and the second mapping may be specified based on the selection.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A-15B depict exemplary interfaces for registering a standard.

FIGS. 16A-16B depict exemplary interfaces for registering controlled terminology.

FIGS. 19A-19C depict exemplary interfaces for mapping tables to domains.

FIG. 23 depicts an exemplary interface for selecting a variable name for mapping when multiple options are determined to be possible.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
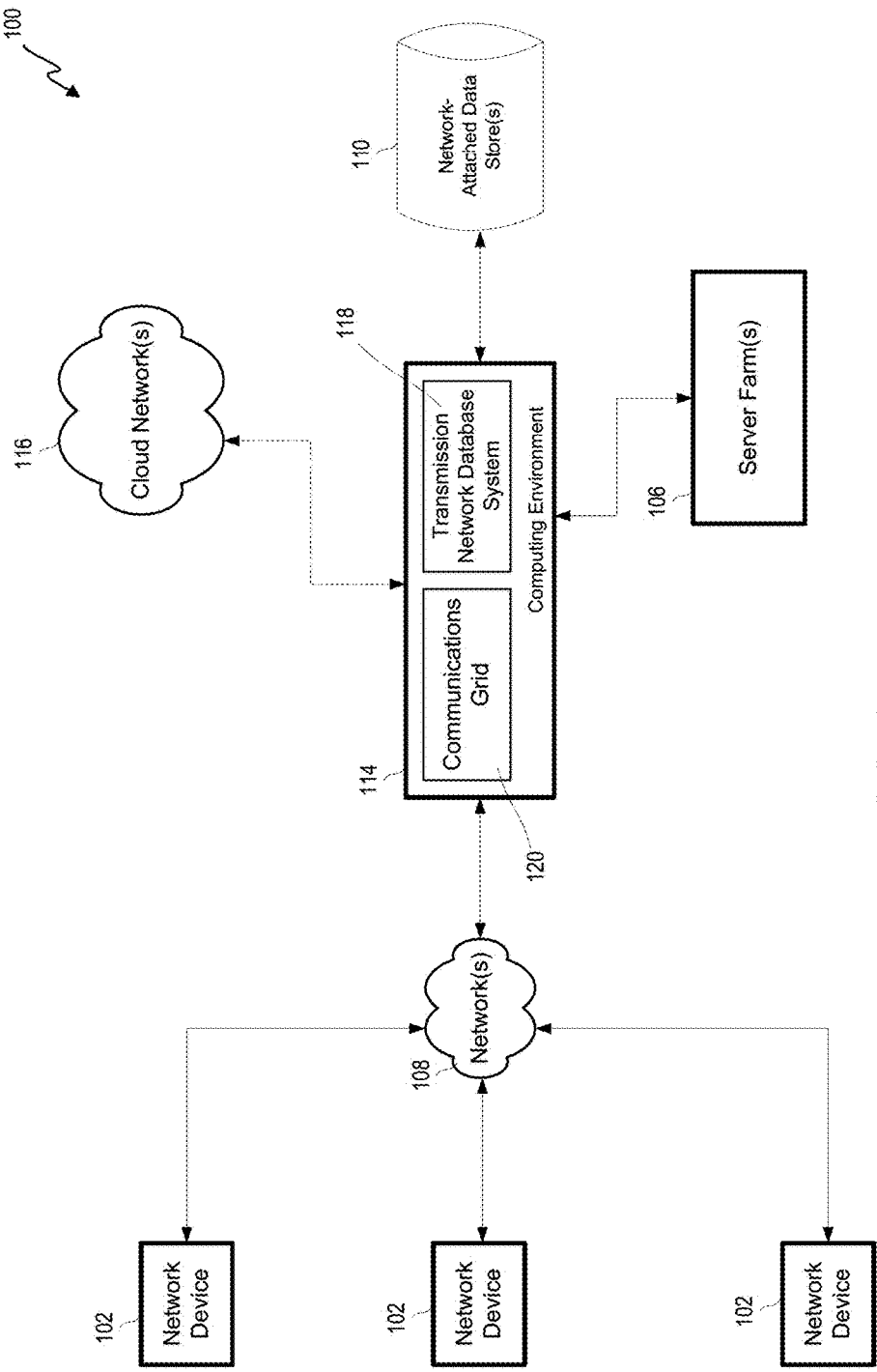
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1X, computing environment 114 may include one or more other systems. For example, computing environment 114 may include a database system 118 and/or a communications grid 120.

Figure 8:
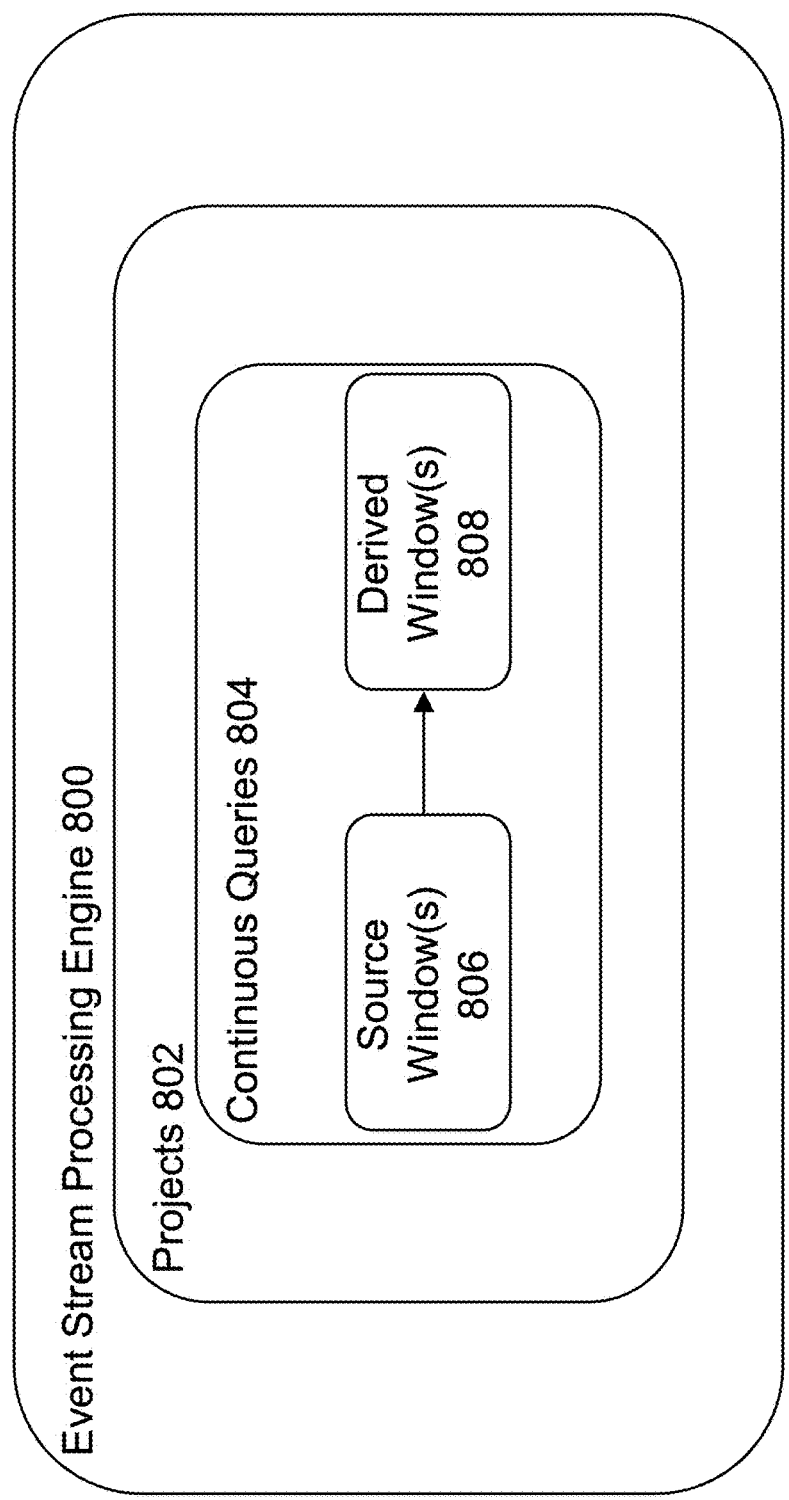
FIG. 8 illustrates a block diagram including components of an Event Stream Processing Engine (ESPE), according to embodiments of the present technology.
Figure 9:
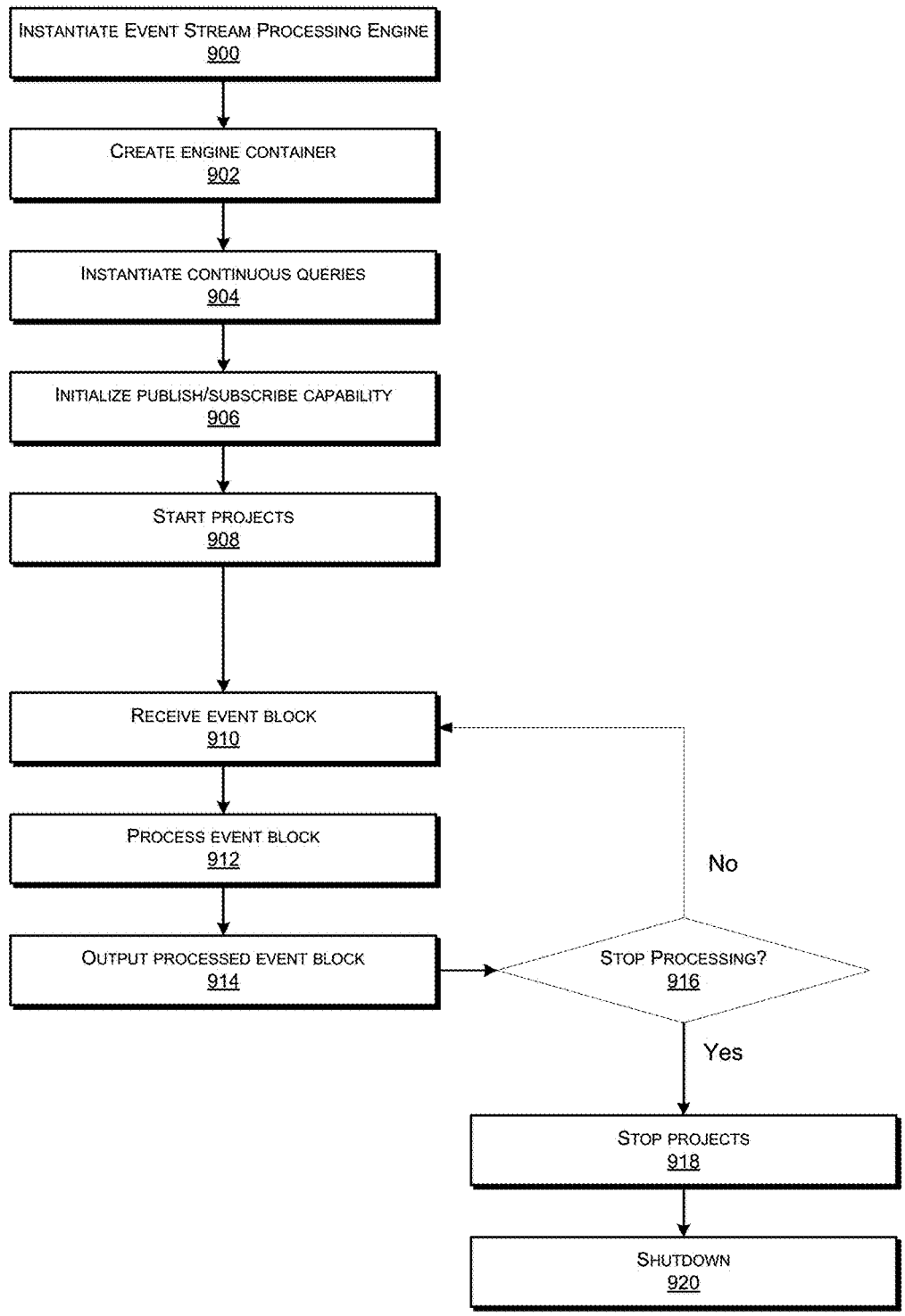
FIG. 9 illustrates a flow chart showing an example process including operations performed by an event stream processing engine, according to some embodiments of the present technology.
Figure 10:
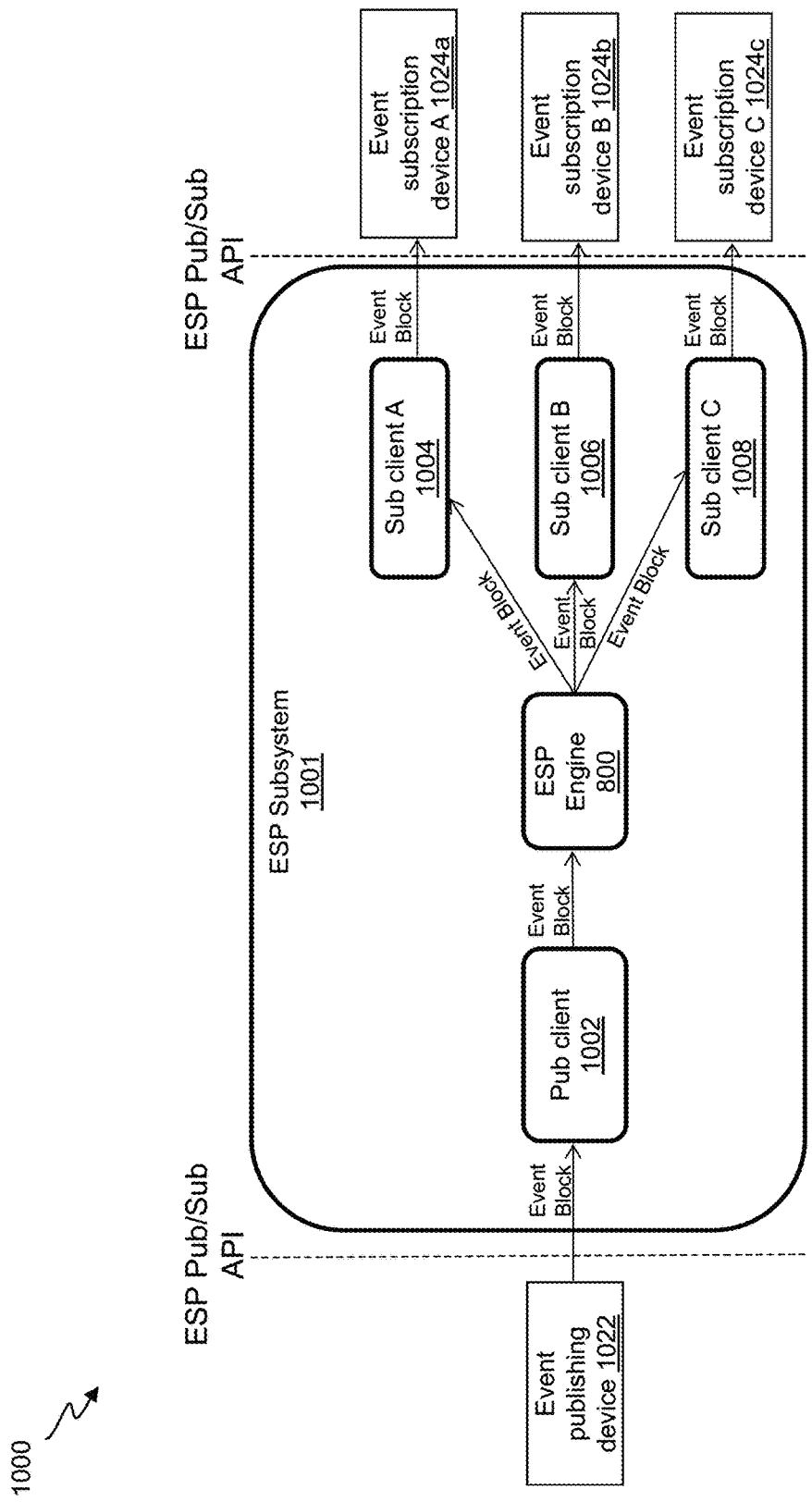
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
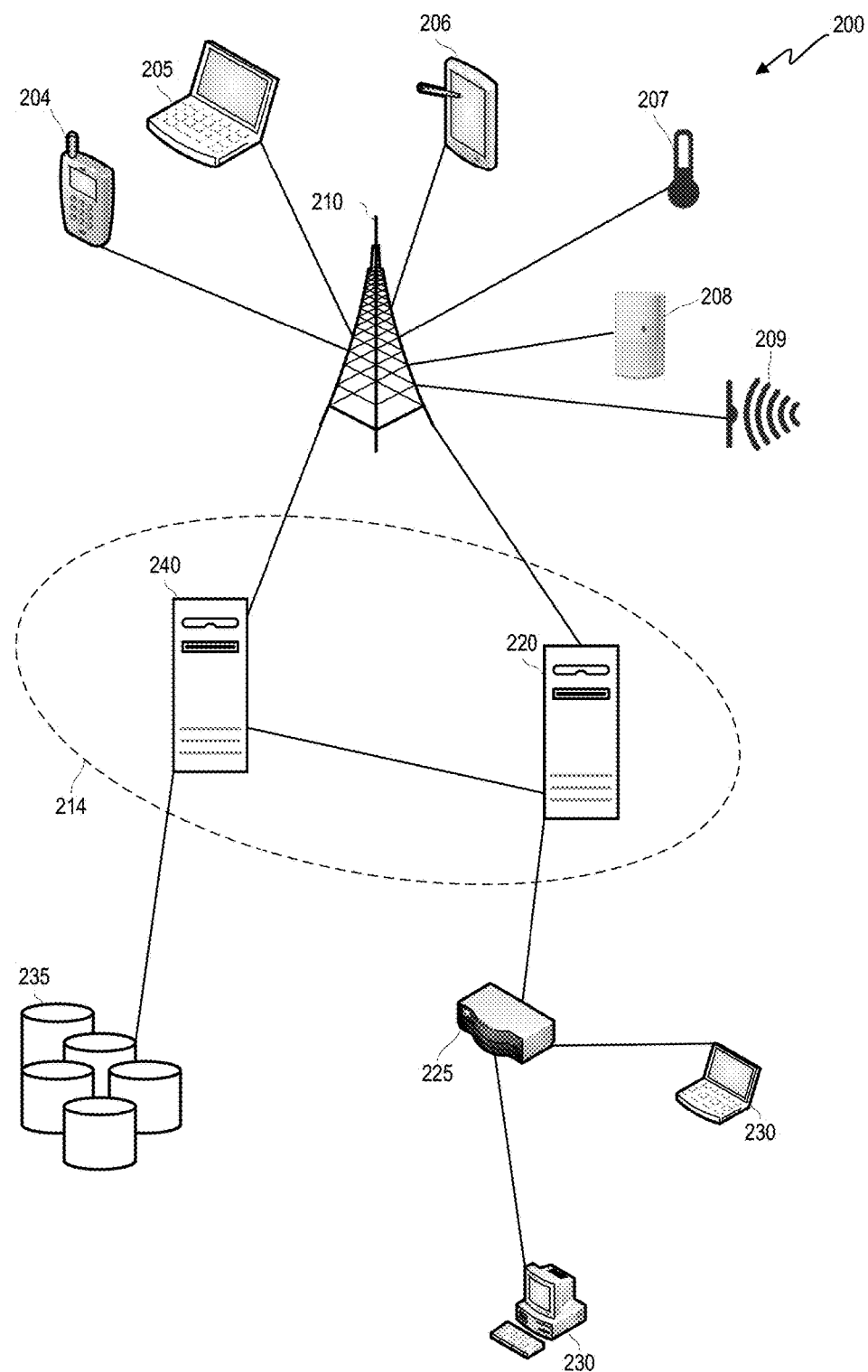
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2X, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
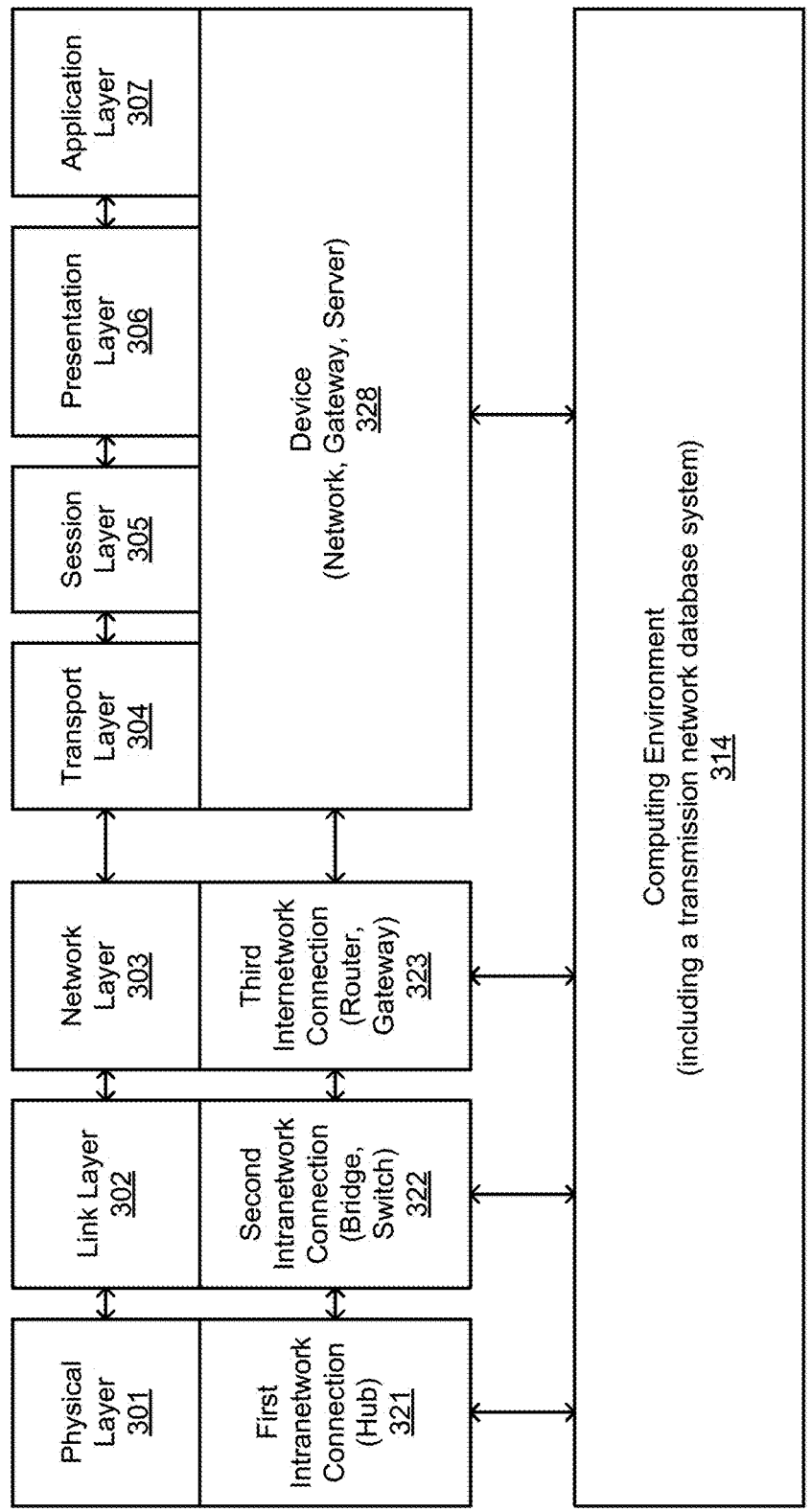
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3X identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
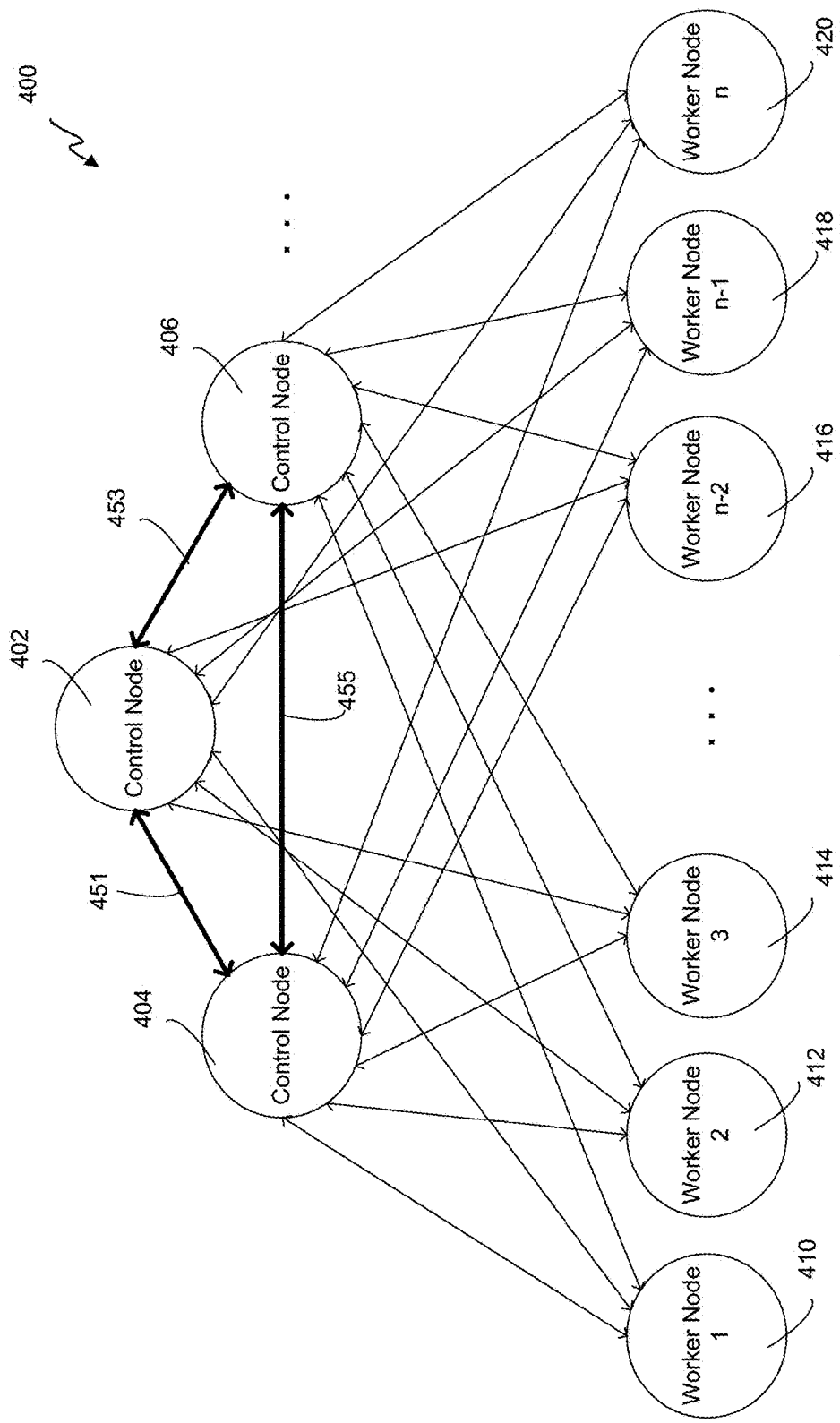
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4X as including three control nodes, the communications grid may include more or less than three control nodes.

Communications grid computing system (or just "communications grid") 400 also includes one or more worker nodes. Shown in FIG. 4 are six worker nodes 410-420. Although FIG. 4X shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
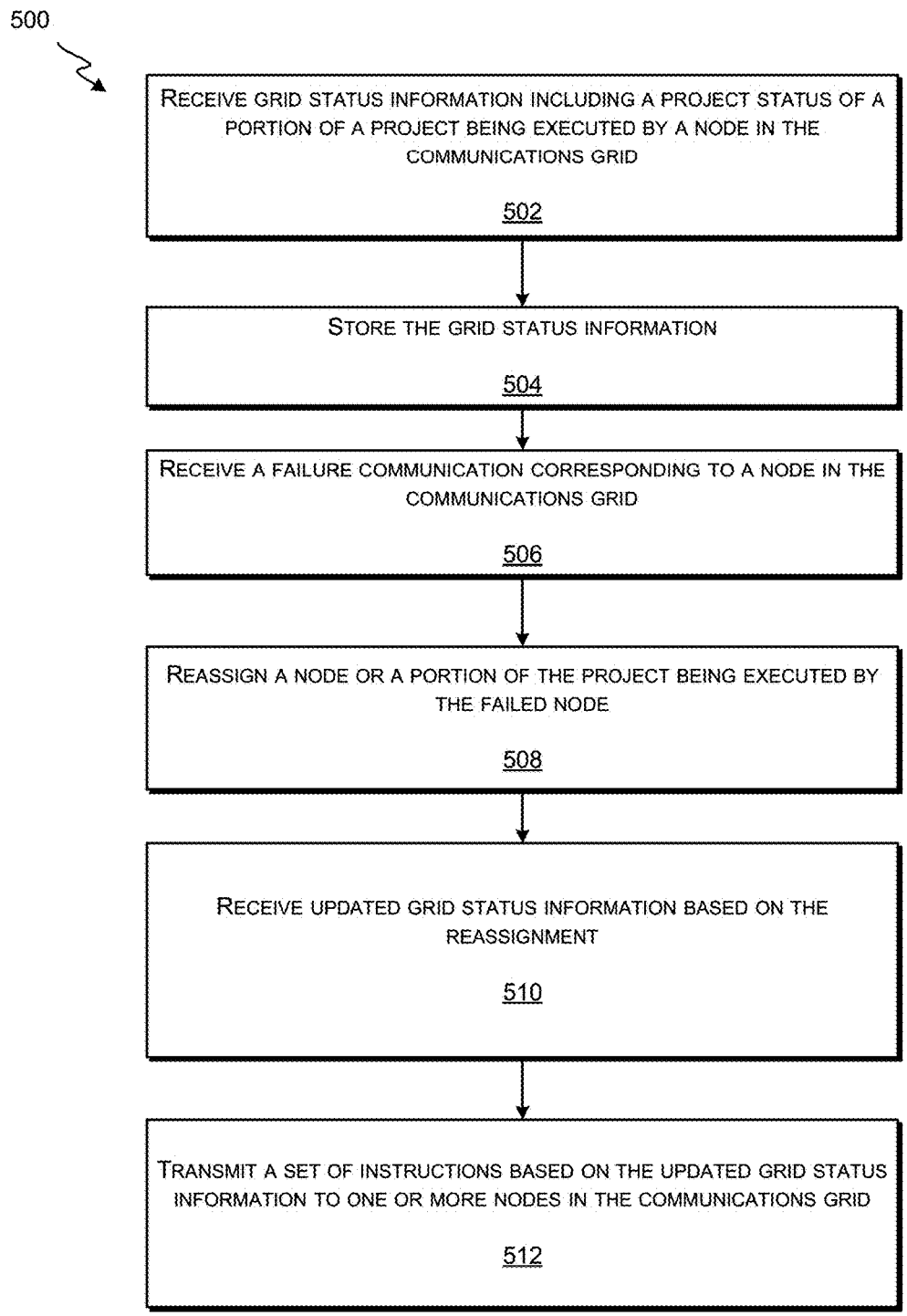
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
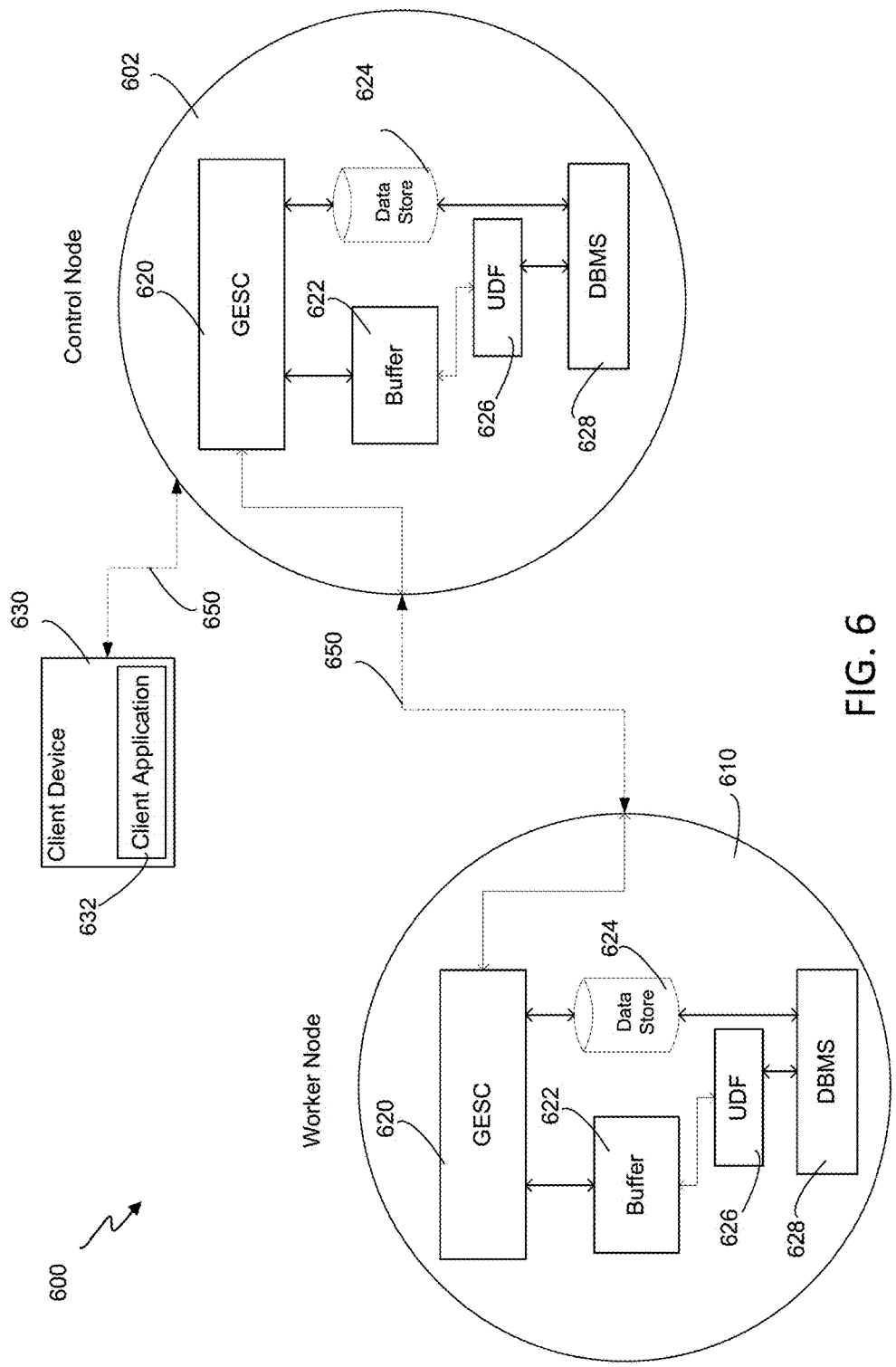
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1X and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
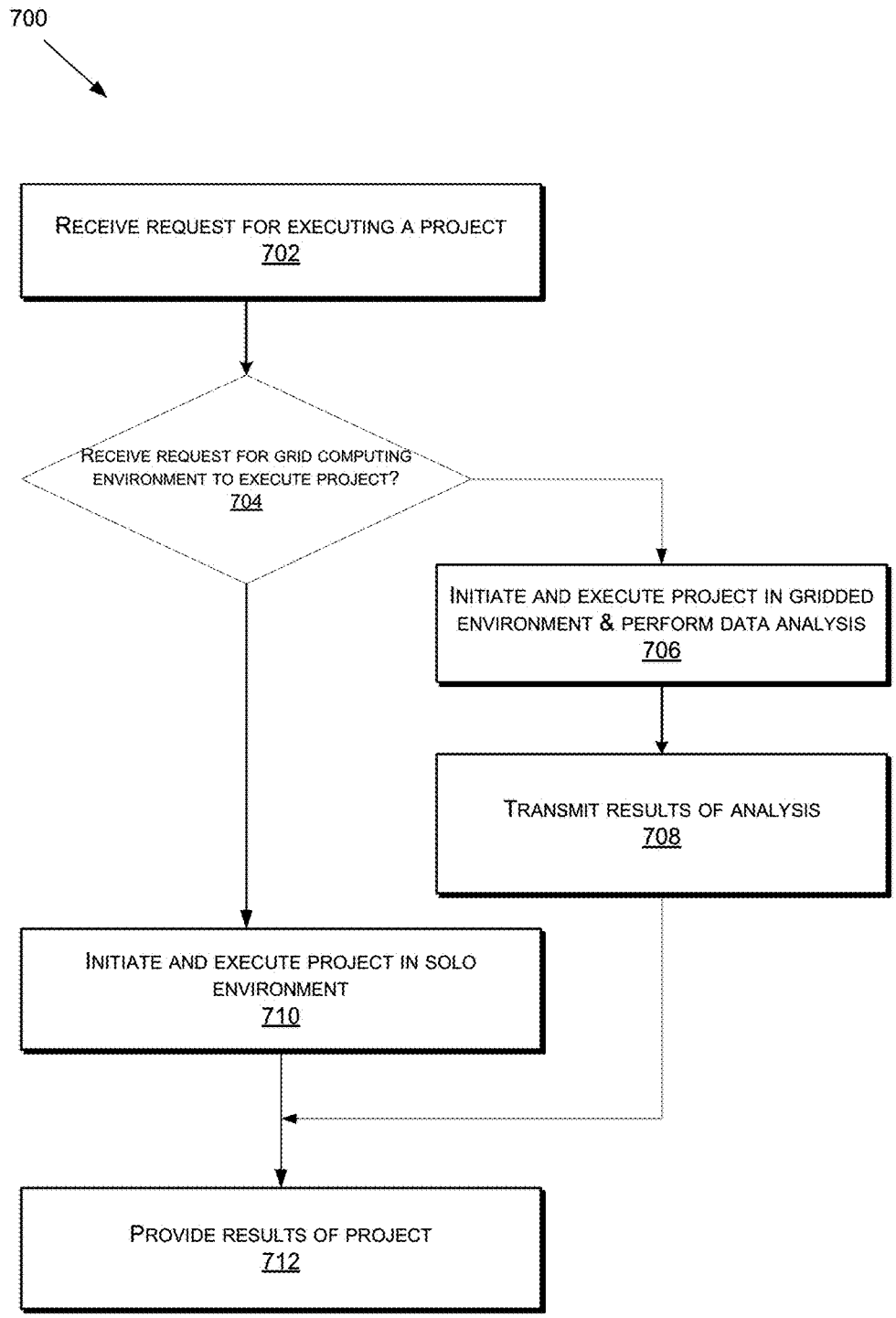
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6X, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2X, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2X may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2X.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2X. As noted, the network devices may include sensors that sense different aspects of their environments, and may collect data over time based on those sensed observations. For example, the ESPE may be implemented within one or more of machines 220 and 240 shown in FIG. 2X. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9X, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2X, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
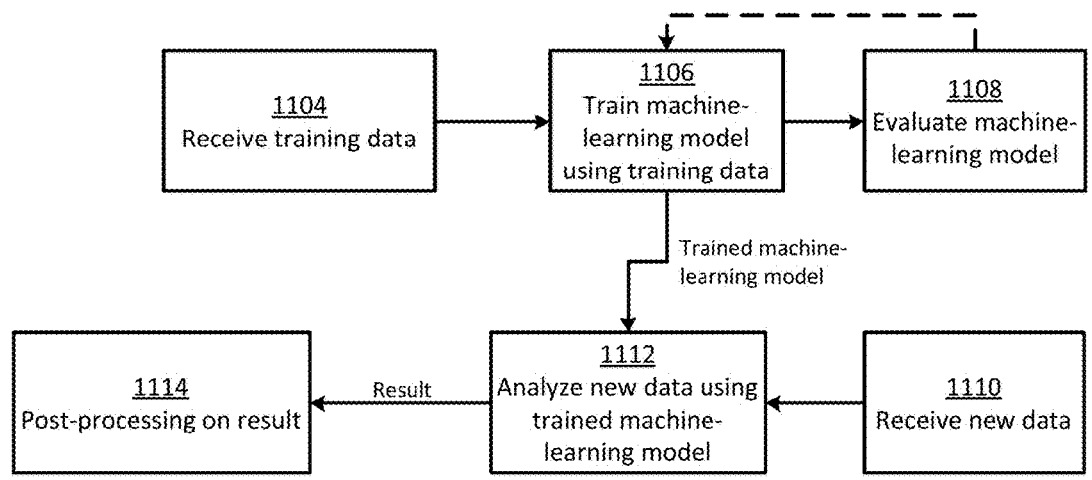
FIG. 11 illustrates a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner.

In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
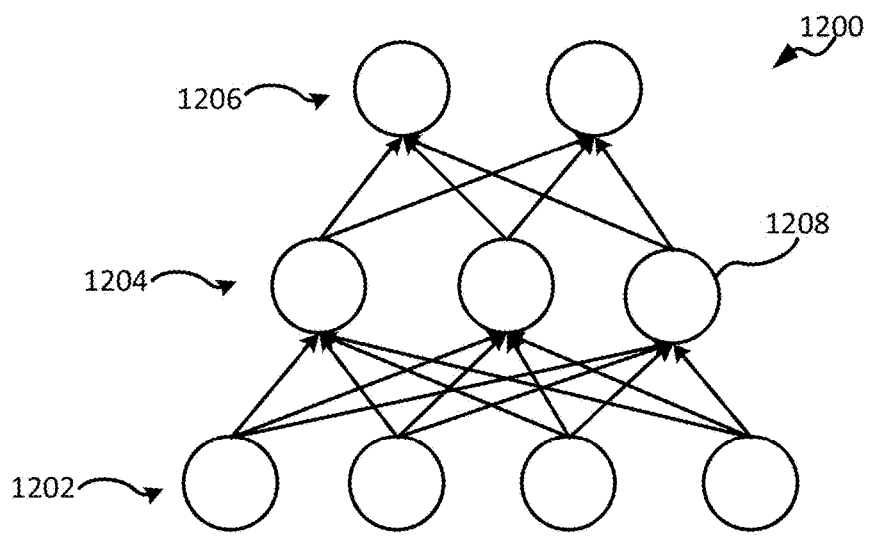
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy. Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system described herein.

Data is typically stored as a value for a variable. The variables may be identified by a variable name; for example, a variable named "age" might carry a value of "22" for a data point representing one individual and a value of "40" for another.

In some circumstances, such as clinical trials, experiments, etc., a large amount of data may be collected and organized into tables (note that, in some environments, a table may also be referred to as a "dataset"). For example, each table may represent a group of related variables (e.g., one table may include demographic data, such as gender, age, height, and weight; another table may include pertinent lab measurements, such as blood glucose level, blood oxygen level, etc.). A defined dataset that contains related variables is referred to herein as a domain.

Variable names in a given domain may be subject to standards that allows the data to be more readily shared, reported, or merged (e.g., across clinical trials or experiments). The standards may provide naming conventions. However, standards often represent guidelines, rather than hard-and-fast rules. Accordingly, there remains room for interpretation when implementing the standard. Different researchers may therefore apply slightly different variable names to the same concept, making it difficult for the data to be shared.

Conventionally, variable names could be harmonized manually, with the harmonization being a subjective measurement of the user's view of how data from a study should be named.

Exemplary embodiments improve on this process by automatically mapping variable names to standards. The standards may define one or more domains for data, and may provide a guideline for how variables within the domain should be named. Each variable may be stored in a table which holds related groups of variables. The variables may be named by defining mappings, each mapping including two levels of mapping rules. A first mapping rule maps a domain of the standard to the table, while a second mapping rule maps a variable within the table to a variable within the domain. When a mapping rule exists that provides an exact match between a variable name and a standard, an auto-mapping feature may be applied that automatically maps the variable name to the standard. If no exact match exists, then an analysis is performed to determine the most likely mapping candidate. If, following the analysis, no single most-likely candidate can be identified, the top candidates may be presented on an interface to allow a user to select the appropriate variable name.

According to exemplary embodiments, variable name mapping is accomplished using machine learning. Machine learning provides a methodical procedure for determining a mapping from a raw source variable to data variables defined by standards. Machine learning also reduces the burdens associated with manual mapping of source data variables by learning the most appropriate mappings and then automatically performing these mappings to future observations based on historical precedent. This provides repeatability and consistency that may not occur when mapping is performed manually by various programmers performing the same task. Machine learning further ensures faster quality deliverables across a range of raw data sources that the learning technology evaluates.

It is noted that, although particular examples are provided with respect to clinical research for purposes of illustration, the present invention is not so limited. In general, exemplary embodiments may be employed to harmonize or standardize variable names across any two or more collections of data.

Figure 13A:
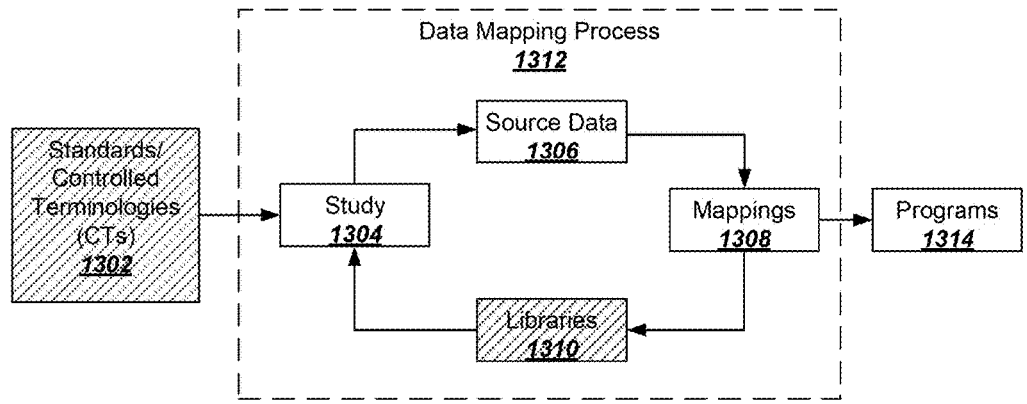
FIGS. 13A-13C are flowcharts depicting exemplary techniques for mapping variable names to a standard.

FIG. 13A provides an overview of the process for building the mappings. In FIG. 13A, blocks having a cross-hatched pattern reference information that may be stored in a knowledge base. The remaining blocks reference information that is derived from a particular study 1304 or collection of data. The goal of this process is to develop a list of mappings 1308 to be applied to a particular study, and to use the mappings 1308 to define one or more libraries 1310 that can be used in the future to map similar (or the same) variable names in a consistent manner.

At block 1302, a standard or list of controlled terminologies (CTs) may be defined. The standard or list may define a domain relating to a group of variables, and suggested names for the variables in the domain (or standards describing how the variables should be named).

At block 1304, the data of a study may be accessed. The study may include multiple variables organized into tables, each table holding a related group of variables.

At block 1306, the raw source data from the study may be accessed. As used herein, "raw source data" refers to data collected for, e.g., clinical trials, in its original format. This may be accomplished by extracting the variable names, along with their associated tables, and storing the name/table pair in memory.

At block 1308, mappings from the standards 1302 to the source data 1306 may be identified. If this particular variable/table combination was defined in the standard 1302 and/or has been previously encountered (e.g., having been stored in the libraries 1310, as described below), then the mapping may be automatically applied. Otherwise, a smart mapping feature may be employed to analyze the similarity between the variable name and the name from the standard 1302. The smart mapping feature identifies top matches for a mapping based on a similarity value; this feature accommodates variations in variable names to identify the top matches, rather than attempting to find an exact match.

Once the smart mapping feature has determined the appropriate name to be applied, the mapping rules may be applied to generate one or more programs 1314 that programmatically maps the variables in the study. Furthermore, the mapping rules may be stored in one or more libraries 1310 for future use. The libraries 1310 may store other information about the mapping rules, such as how many times the mapping rules have been applied in different studies to map particular variable names to the standards 1302.

Blocks 1304, 1306, 1308, and 1310 represent a data mapping process 1312 which may be repeatedly applied as more studies are analyzed. Accordingly, the libraries 1310 may become more extensive (including more mapping rules) and may incorporate frequency information that describes how likely a particular mapping is to be used.

Figure 13B:
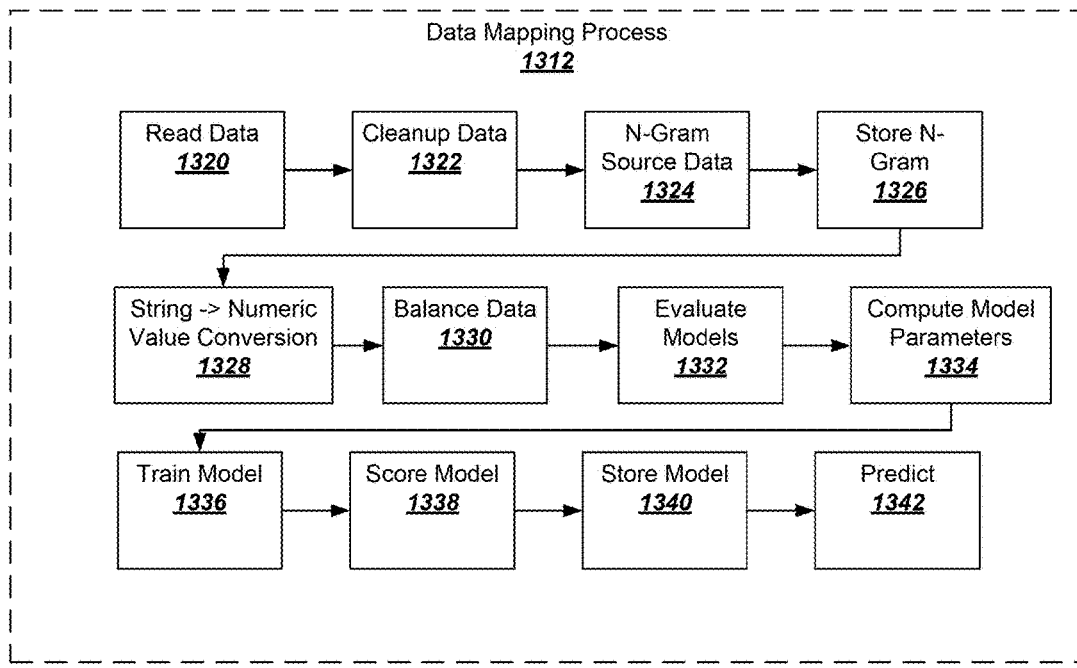

The data mapping process 1312 is described in more detail in connection with FIG. 13B.

At block 1320, the data may be retrieved from its source location and, at block 1322, cleaned up for processing. Cleaning up the data may involve a number of different procedures for placing the raw data into a standardized format. For example, nonexistent records (e.g., "not a number" records) may be removed, the characters of the records may be converted to the same case (e.g., upper case or lower case), redundant columns in the data may be combined, and categories in the data may be filtered to remove those categories that do not have more than a predetermined minimum number of data points.

Generally, the names of variables in the data set will have been determined based on the standard; the mapping process described herein standardizes these naming selections and, when different names have been chosen by different users, predicts the most likely term in the standards that the variable name is referencing. Because the variable names are based on the standards in the first place (albeit, subjectively), it is likely that the names will bear at least a superficial resemblance to the suggested variable names from the standard; most probably, the suggested name from the standard that is "closest" to the variable name in the data is the correct one for the mapping.

Thus, a measure of "closeness" is needed to map the variable names to the standard. In order to determine how close a variable name is to a name defined in a standard, at block 1324, the source data may be subjected to an n-gram analysis. N-gram analysis works by traversing through a word (in this case, the variable name) n letters at a time, storing each group of n letters. When n is 2, for example, this is referred to as a 2-gram or bigram analysis. When n is 3, this is referred to as a 3-gram or trigram analysis. A 2-gram analysis of the word "LANGUAGE," for example, would yield the following pairs: {LA, AN, NG, GU, UA, AG, GE}.

A 3-gram analysis would yield: {LAN; ANG; NGU; GUA; UAG; AGE}. These sets of n letters may be compared to similarly-determined sets of letters from the suggested variable names from the standard. According to exemplary embodiments, a 2-gram analysis is preferably performed. At block 1326, the n-grams determined in block 1324 may be stored.

At block 1328, a string to numeric value conversion process may be performed to generate a dictionary with term-frequency/inverse document frequency values. These values may be used to rescale the dictionary to place more weight on relatively less common n-grams. This step facilitates processing efficiency and yields more accurate results. For similar reasons, at block 1330, the data may be balanced to address over- and under-sampling.

It may be possible to evaluate the closeness of the n-grams of the variable names to the n-grams of the standard using different models. An example of such models includes, but is not limited to, a logistic regression model, a decision tree classifier, a random forest classifier, a Gaussian naïve Bayes model, a multinomial naïve Bayes model, or a "one versus rest" classifier, such as a linear support vector machine or a stochastic gradient descent classifier. Accordingly, at block 1332, different available models for mapping data variable names to a domain may be evaluated.

At block 1334, initial parameters associated with the models may be computed, and at block 1336, the model may be trained. Training the model may involve fitting the model using training data in which the correct mapping of a variable name to a standard is known a priori.

At block 1338, each evaluated model may be scored based on how well the model accommodates the known correct mappings (e.g., based on a percentage of variable names that the model correctly maps to the standard). The model with the highest score may be selected for use with this particular mapping, and at block 1340, the model may be stored in a non-transitory computer readable storage medium. Subsequently, at block 1342, the trained model may be used to predict a variable name mapping for new data.

Figure 13C:
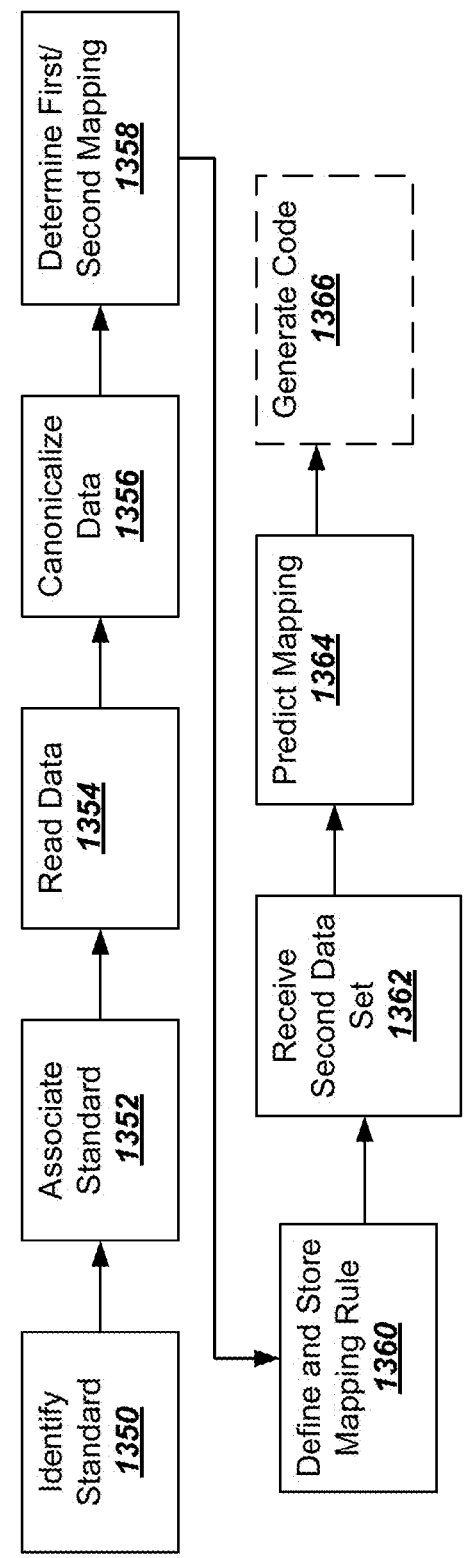

The above-described process may be implemented as logic in an electronic computing system. FIG. 13C depicts exemplary logic for such an implementation.

At block 1350, the system may receive an identification of a standard. The standard may define one or more domains, where a domain represents a defined dataset that contains a group of related variables (e.g., in a clinical trial, a "subject" domain might include variables such as age, gender, weight, height, etc.). The standard may represent a collection of recommended names for domain variables pertaining to data associated with each respective domain.

At block 1352, the system may associate the standard with a collection of data referred to herein as a "study". The collection of data may include one or more tables, each table including one or more data variables having respective variable names.

Figures 15A, 15B:
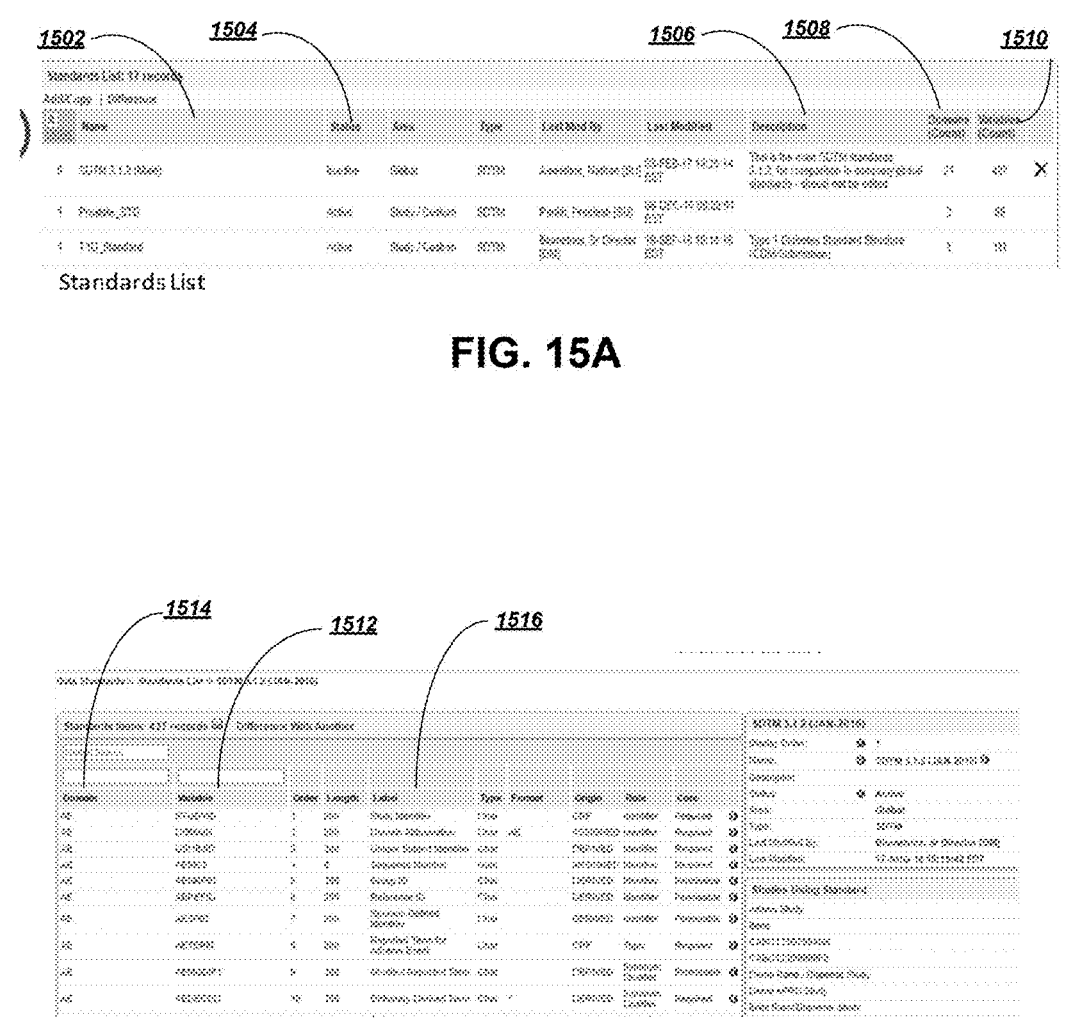

For instance, FIGS. 15A-15B depict exemplary interfaces for registering a standard. FIG. 15A depicts a list interface that includes a field 1502 shows the name of available standards, a field 1504 indicating whether the standard is currently active for the present study, and a field 1506 with a brief description of the standard. The field 1502 may include names of available standards that are accessible on the current system; a standard may be made accessible by, e.g., uploading a file containing information about the standard to a predetermined location, registering the standard through a registration interface, automatically scanning a local or predetermined remote system for a standard file, etc.

The name of the standard may be the filename of the standard, or the standard name may be defined in data or metadata of the standard file. The active status of the standard may be automatically determined based on information from the study and/or the standard, and/or may be manually determined when a user indicates that the standard should be made active for the study. The description of the standard may be derived from data or metadata in the standard file, or may be drawn from a description of standards stored at a different location from the standard itself.

Among other features, the list interface shows the number of domains 1508 defined by the standard and a total number of variables 1510 used by the standard. A standard file may be arranged as a number of tables (representing domains), each table storing a number of variables (representing variables used by the standard). The number of domains and number of variables may be determined by examining the number of tables and total number of variables, respectively, in the standard file. Alternatively, the standard may be stored as a single list of variables, each variable being associated with a given standard. The number of variables may be identified by totaling the number of variables in the list, and the number of domains may be determined by identifying a number of unique domain names associated with the variables.

Upon selecting a standard, a domain/variable list interface such as the one depicted in FIG. 15B may be shown. The domain/variable list interface lists each variable defined by the standard, with a suggested canonical name 1512 for the variable and a domain 1514 to which the variable belongs. In place of the canonical variable name, a naming convention may be provided that describes principles that should be applied when naming a variable containing a particular type of information. A description 1516 of the variable may also be provided.

Figures 16A, 16B:
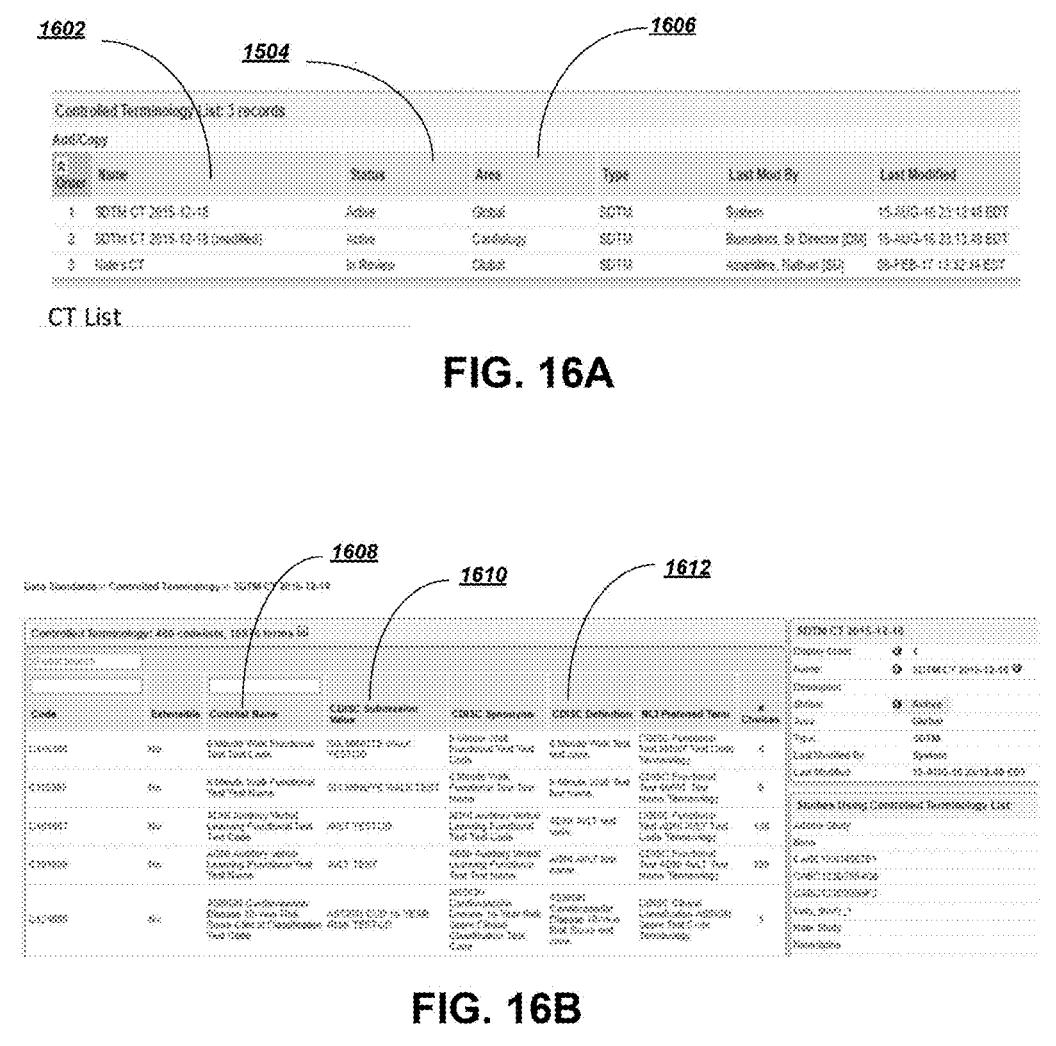

As an alternative or in addition to registering a standard, controlled terminology may be registered. Controlled terminology refers to industry-standard expressions used with data items in data sets. FIGS. 16A-16B depict exemplary interfaces for registering controlled terminology.

FIG. 16A depicts a controlled terminology list interface that shows sets 1602 of controlled terminology that are available for use. A status 1604 may indicate whether the controlled terminology is active for the current study. The controlled terminology list interface may further describe, for example, an area or technical field 1606 in which the controlled terminology is applied.

Upon selecting a particular list of controlled terminology, a terminology interface such as the one depicted in FIG. 16B may be displayed. The terminology interface may describe, for example, a suggested name 1608 for a variable response set, a description 1610 of the information the variable value encompasses, a definition of the variable value 1612, etc.

Returning to FIG. 13C, at block 1354, data from the collection may be read into a non-transitory storage medium of the electronic computing system. For instance, the system may be provided a path to a file that contains study data, such as a location in a study repository (see FIG. 14). The data from the study repository, which may include various values for variables organized into tables, may be retrieved and read into a memory of the device.

Figure 17A:
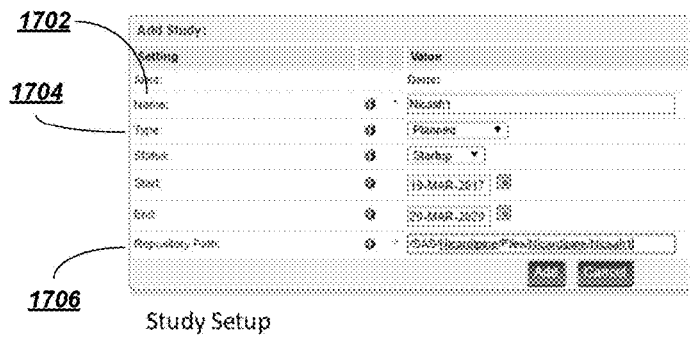
FIGS. 17A-17D depict exemplary interfaces for setting up a study.

For instance, FIGS. 17A-17D depict exemplary interfaces for setting up a study. As shown in FIG. 17A, a study setup interface may allow a user to specify the name 1702 of the study and information about the study, such as a type 1704 of the study, a status of the study, and a timeframe during which the study was conducted (e.g., using start times and end times). The user may further provide a path 1706 to the repository containing the study data.

Figure 17B:
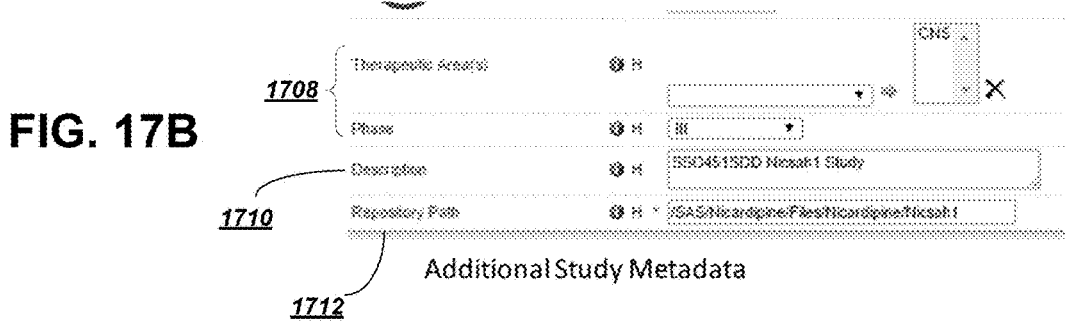

Upon establishing initial study data in the study setup interface of FIG. 17A, an additional study metadata interface may be presented to the user, as shown in FIG. 17B. This interface allows the user to specify additional information 1708 about the study; the additional information 1708 may include default parameters and/or custom parameters that may be defined, for example, by the study type 1704 as specified in the study setup interface. The metadata interface may further provide a field 1710 for adding a description of the study and a repository path 1712 for additional study metadata.

Figure 17C:
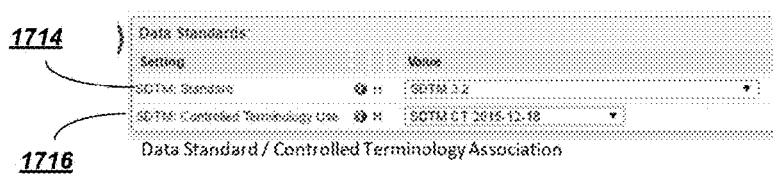
Figure 17D:
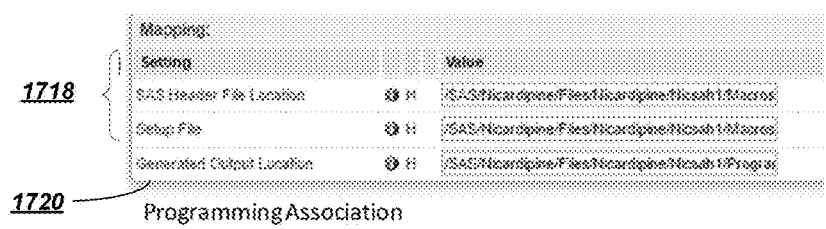

The user may further be presented with a data standards interface, as shown in FIG. 17C, allowing the user to associate standards 1714 and/or controlled terminology 1716 with the study. The standards 1714 and controlled terminology 1716 may include the standards and controlled terminology registered with the system in the interfaces shown in FIGS. 15A-16B.

Upon mapping the variable names according to the standards/controlled terminology, one or more scripts or other program files (for automatically renaming the variables in the study). Accordingly, a programming association interface, such as the one shown in FIG. 17D, may be presented. The programming association interface may include input fields 1718 providing basic setup information for establishing the scripts or program files, and a designated output location 1720 to which the generated script/program file will be saved.

Figures 18A, 18B:
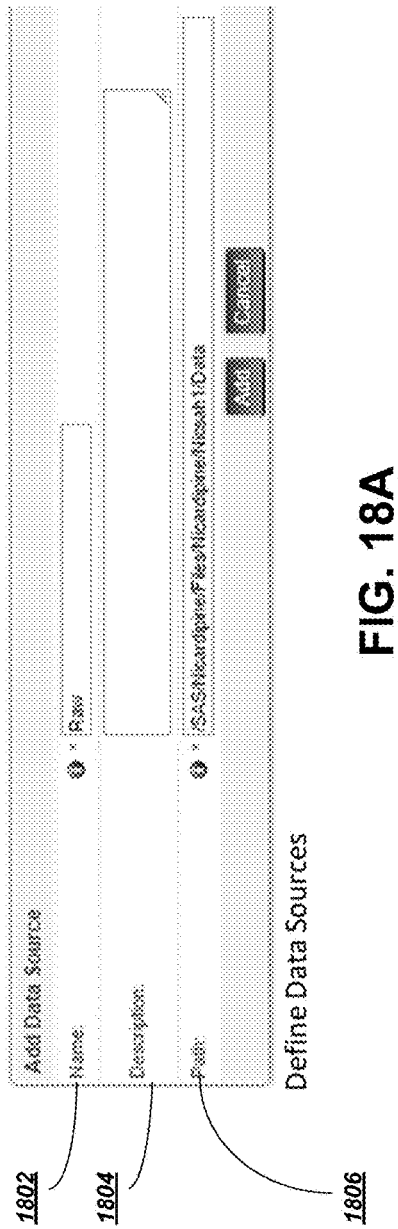
FIGS. 18A-18B depict exemplary interfaces for identifying data sources.

It may not be necessary or desirable to analyze every data point in the study; for instance, it may be that only a subset of domains for which data has been collected in the study are relevant to a particular analysis. Thus, FIGS. 18A-18B depict exemplary interfaces for identifying data sources related to the study. This may involve, for instance, specifying particular tables within the study data that are subject to analysis and variable name standardization.

As shown in FIG. 18A, the user may specify a name 1802 of a data source within the study, a description 1804 of the data in the source, and a path 1806 to the data source (e.g., within the previously-identified repository). When the thus-identified data source is identified, the data source may be added to the study being constructed.

As the data is added, a summary interface summarizing the variables in the data source (such as the one depicted in FIG. 18B) may be displayed. The summary interface shows the source 1808 of the variable (which should correspond to the source 1802 identified in previous the data source interface), the table or dataset 1810 within the source 1808 from which the variable is derived, the name 1812 of the variable, and a description 1814 of the variable. This information may be derived from the data source identified by the path 1806, or may be derived from a different location.

Returning to FIG. 13C, at block 1356, the collection of data may be canonicalized. Canonicalization may involve, for example, removing empty records, converting the collection of data to a same letter case, combining columns in the collection of data, or filtering categories in the collection of data to remove categories having observation counts below a predetermined minimum threshold.

At block 1358, a first mapping of a selected table from the one or more tables to a specified domain of the one or more domains may be determined. Furthermore, a second mapping of a selected data variable name within the selected table to a specified domain variable name within the specified domain may also be determined.

Determining the first mapping and the second mapping may involve analyzing a name of the selected table and the selected data variable name to generate a plurality of n-grams of the selected table name and the selected data variable name. According to one embodiment, the n-grams may be applied with a value of n=2. The n-grams may be stored in a dictionary, which may be re-scaled based on an analysis of the n-grams. For instance, the dictionary may be re-scaled based on a term-frequency/inverse document frequency (TF-IDF) analysis.

As described above, a plurality of naming models may be evaluated to determine which of the plurality of models produces a highest weighted accuracy in mapping terms of the dictionary to terms of the standard, and the model with the highest weighted accuracy may be presented to a user for selection in order to map the data variable names. The weighted accuracy may be determined by determining a mapping defined by the selected mode. The mapping may match a variable name of the model to the selected data variable name. Based on the n-gram analysis, a mapping score may be determined that describes how closely the variable name of the model matches the selected data variable name.

Figures 19A, 19B, 19C:
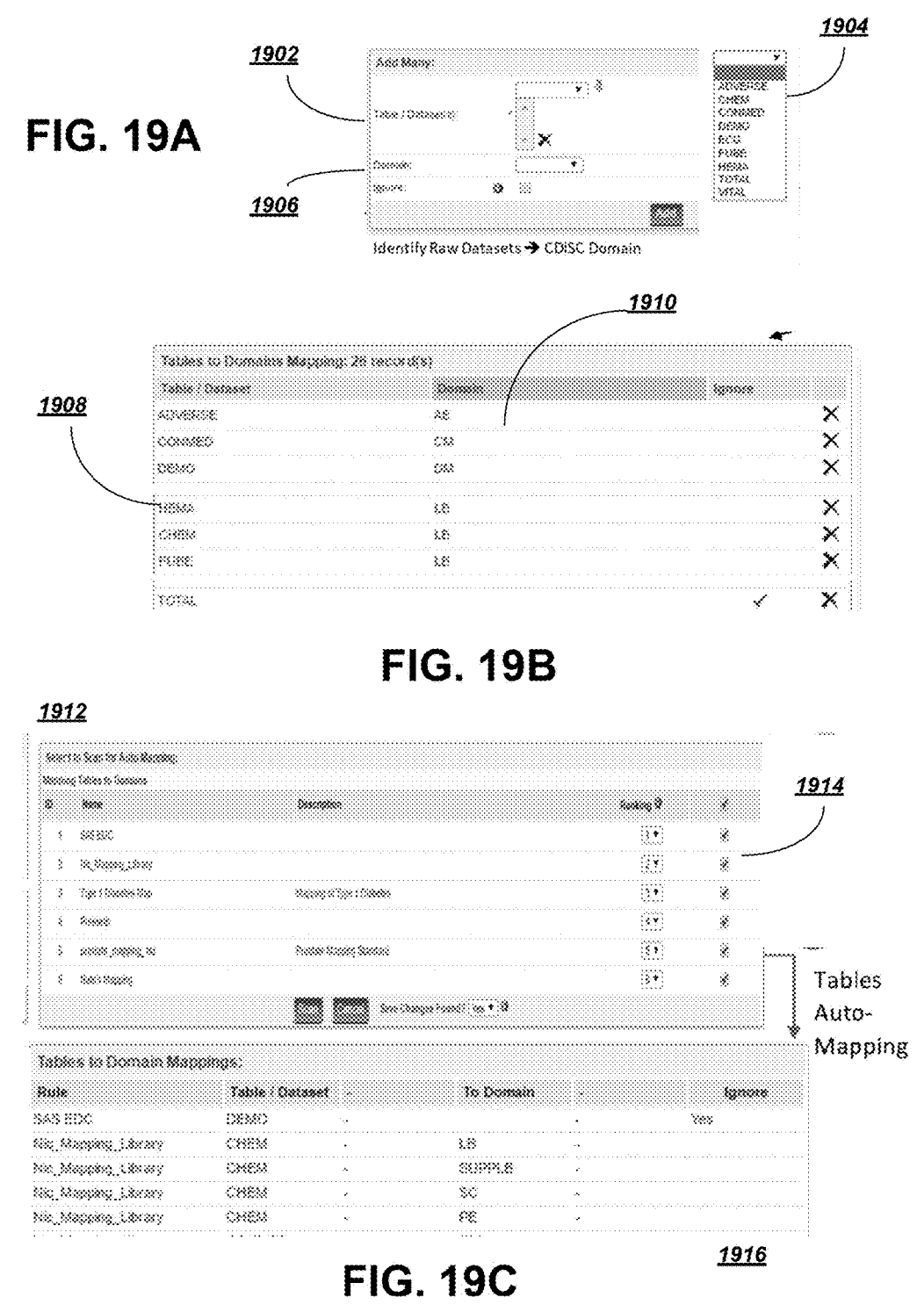

FIGS. 19A-19C depict exemplary interfaces for mapping tables to domains. FIG. 19A depicts an interface allowing a user to select a table from the study and a domain from the standards identified in block 1360 that should be associated with the table. The interface may include a table/dataset 1902 designator, which may pop up a list 1904 of available tables/datasets. A further field 1906 allows the table to be associated with a domain from one of the standards registered with the system.

FIG. 19B depicts a summary interface allowing the thus-associated domains and tables to be reviewed. The summary interface includes an identifier 1908 of the table or dataset indicated in the designator 1902, and the domain 1910 to which the table/dataset was mapped.

Once initially designated, the system may then apply the below-described auto-mapping and/or smart mapping procedures to attempt to map table names within the study to the standards. FIG. 19C depicts a mapping review interface 1912 showing the mappings generated by the auto- or smart-mapping procedures. A checkbox 1914 allows a user to apply or ignore the recommended mapping. Those mappings that are selected for application may be reflected in a table to domain mappings interface 1916.

Figure 20:
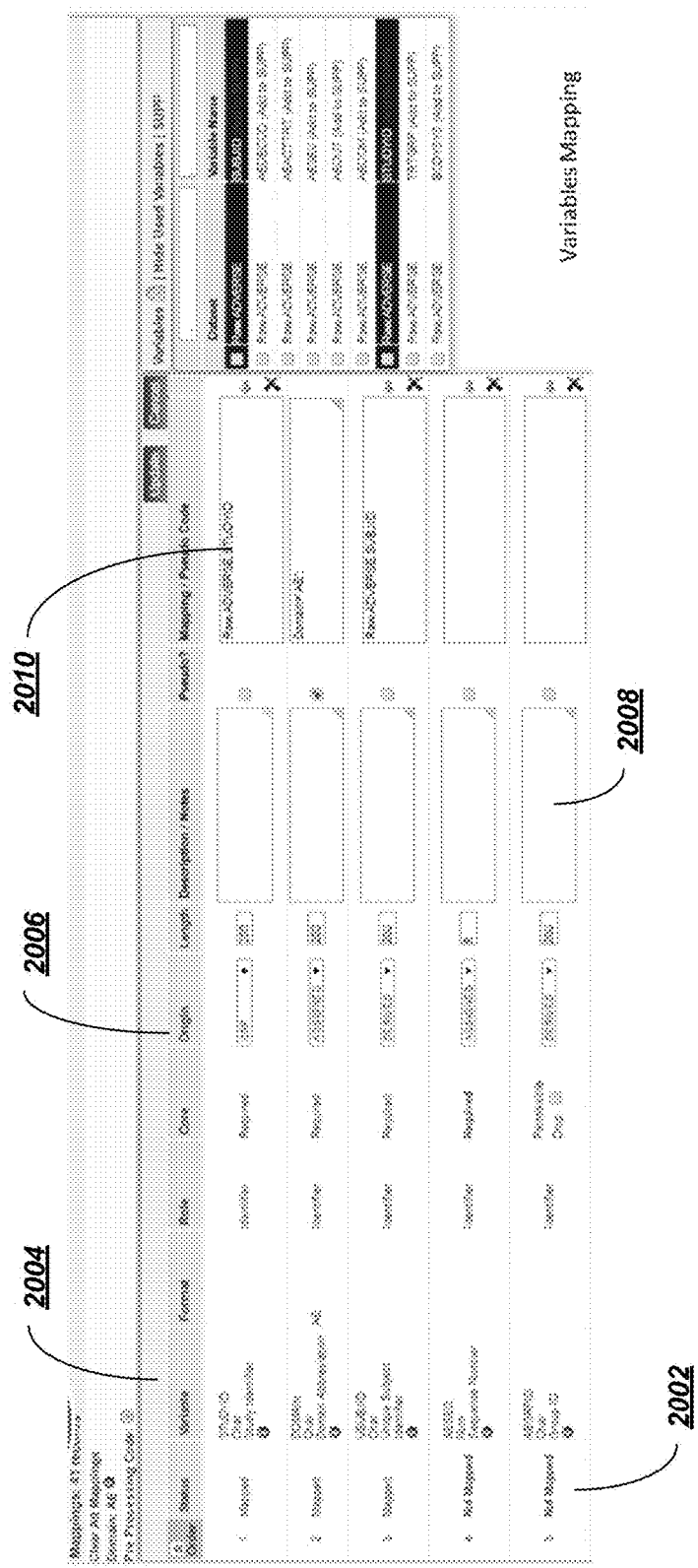
FIG. 20 depicts an exemplary interface for mapping variables in a table to variable names defined by a domain.

The user may edit the variable mapping (second level) and/or apply metadata or other information to the mapping using an interface such as the one depicted in FIG. 20. A status 2002 may indicate whether the variable 2004 in question has been mapped. The interface may identify the origin 2006 of the variable (e.g., which data set the variable came from, whether the variable was not present in an original data set but was instead derived from existing data, etc.). The interface may further provide a field 2008 to add a description of the variable and/or any notes pertinent to the mapping of the variable. The system may also allow a user to specify pseudocode 2010. This pseudocode 2010 may be incorporated into the generated scripts or program files.

Returning to FIG. 13C, at block 1360, the first mapping and the second mapping may be identified in the selected model. This may involve identifying the model parameters that gave rise to the first mapping and the second mapping and preserving those parameters as a mapping rule that can be applied to future data. The mapping rule may optionally be stored in a library (e.g., as metadata in the library), and the mapping rules in the library may be accessed when predicting that the selected one of the new variables should be mapped to the specified variable name within the specified domain.

Figure 25A:
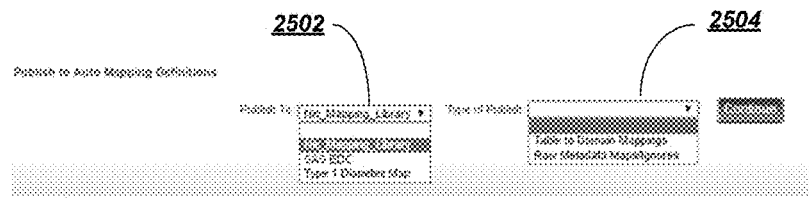
FIGS. 25A-25C depict exemplary interfaces for publishing mapping rules to a library.
Figure 25B:
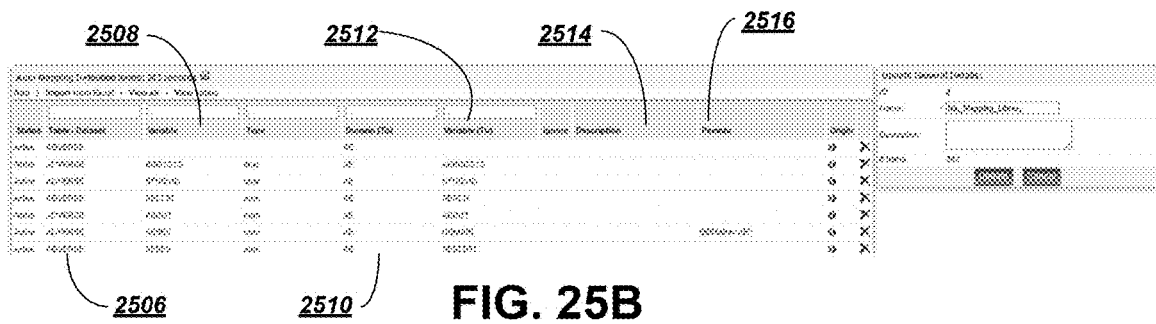
Figure 25C:
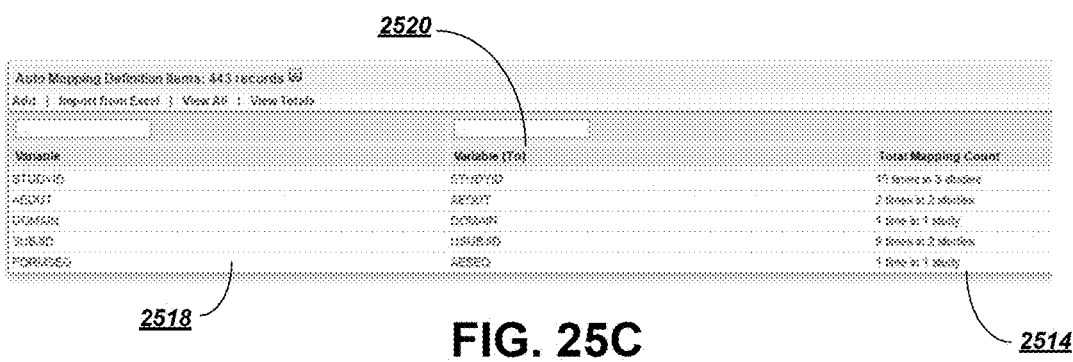

FIGS. 25A-25C depict exemplary interfaces for publishing mapping rules to a library. The publication interface of FIG. 25A allows a user to select a newly-generated mapping rule 2502 and to publish the mapping rule to a selected mapping library 2504. The user may maintain multiple different mapping libraries 2504 applying different mapping rules 2502 for different contexts; the particular mapping library 2504 to which this rule 2502 should be published may be selected in the interface.

FIG. 25B depicts a summary interface showing the mapping rules applied by a given library. The interface may summarize, for example, the table or data set 2506 from which the source variable was read, the name 2508 of the source variable, the domain 2510 to which the table-dataset 2506 has been mapped, the name of the target variable 2512 from the standard to which the source variable is mapped, a description 2514 of the mapping, and the pseudo code from the mapping (see, e.g., FIG. 20).

The frequency interface of FIG. 25C shows how many times 2522 a given mapping rule has been applied in different studies. The frequency interface may indicate the name of the source variable 2518 and the name of the target variable 2520 that are subject to the mapping rule. This information may be stored, e.g., as metadata in the mapping library. The frequency data may be used to select between different mapping rules that are each reasonably consistent with a mapping to a variable name to a standard (e.g., within a predetermined threshold likelihood).

Returning to FIG. 13C, at block 1362, a new data set including one or more new tables may be received. The new tables may each include one or more new data variables having respective new variable names.

At block 1364, the above-described mapping rule may be used to predict that a selected one of the new data variables should be mapped to the specified domain variable name within the specified domain based on one or more factors, such as: the new variable name of the selected one of the new data variables is identical to the selected domain variable name ("auto-mapping"); or the new variable name matches the selected domain variable name within a predetermined threshold closeness value ("smart mapping") Examples of domain name variables that match a new variable name within a threshold closeness value might be, e.g., "UID" compared to "UsID", "age_range" vs "agerange", etc. Smart mappings from previous studies may feed into auto-mappings for subsequent studies.

In some embodiments, the mapping rule may be created by a first user. The new collection of data may be received from a second user different from the first user, and the mapping rule may be automatically applied to map data in the new collection to the standard when one or more variable names in the new collection exactly match one or more variable names defined in the mapping rule. This procedure is referred to herein as auto-mapping.

Figure 21A:
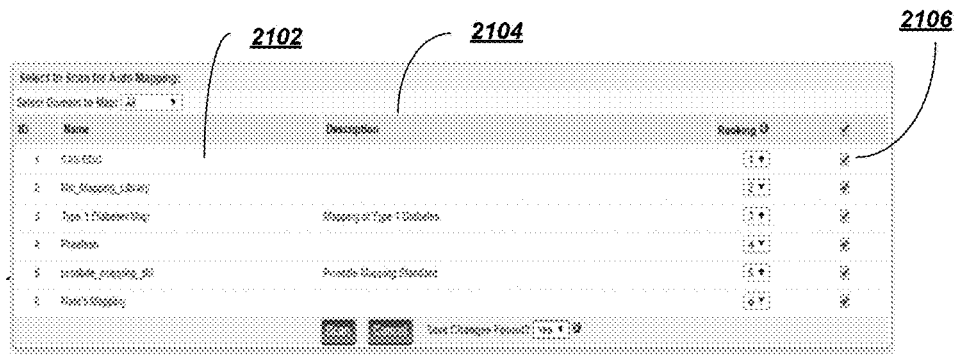
FIGS. 21A-21C depict exemplary interfaces for auto-mapping variables based on exact matches in the variables names.
Figure 21B:
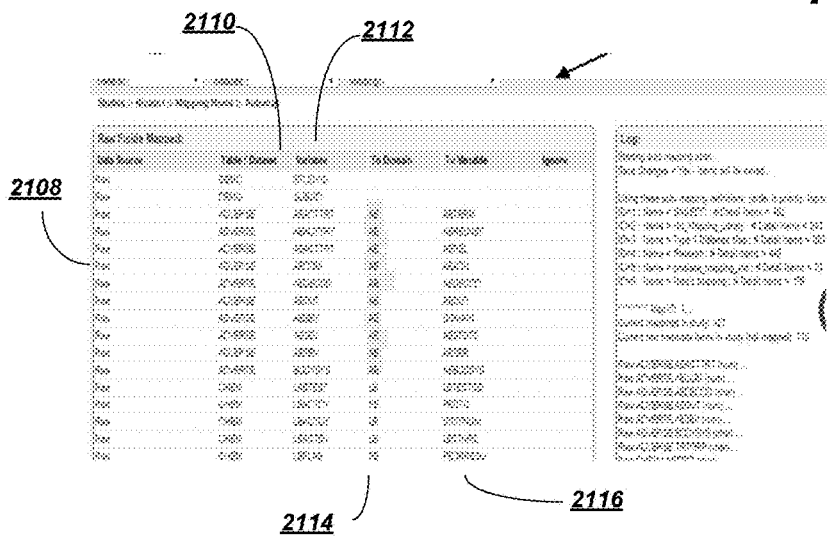
Figure 21C:
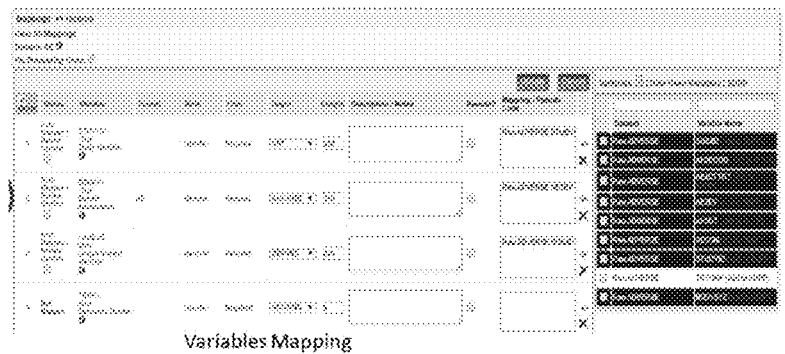

FIGS. 21A-21C depict exemplary interfaces for auto-mapping variables based on exact matches in the variables names. A scan interface (FIG. 21A) shows the available auto-mapping libraries accessible to or registered with the system. The interface may identify a name 2102 assigned to the mapping library containing the mapping rules and a description 2104 assigned to the mapping library. A checkbox 2106 may allow the user to ignore or use the mapping rule as appropriate.

After selecting which of the identified mapping libraries to apply, a summary interface (FIG. 21B) may be presented. The summary interface may identify the data source 2108 from which a given variable originated, the table or data set 2110 within the source that included the variable, a name of the variable 2112, and the domain 2114 and target variable 2116 from the standard to which the variable should be mapped. A variables mapping interface (21C) akin to the interface from FIG. 20 may then allow the user to edit metadata and/or parameters associated with the mappings.

In further embodiments, at least one of the new variable names may be distinct from a variable name defined in the mapping rule. In this case, a degree of similarity between the new variable name and the variable name defined in the mapping rule may be determined. The mapping rule may be applied to the new variable name based on the determined degree of similarity. In another example in which least one of the new variable names is distinct from a variable name defined in the mapping rule, the mapping rule may be applied based on a frequency with which the mapping rule has been applied to map the new variable name to the variable name defined in the mapping rule. These procedures are referred to herein as smart mapping.

Figures 22A, 22B:
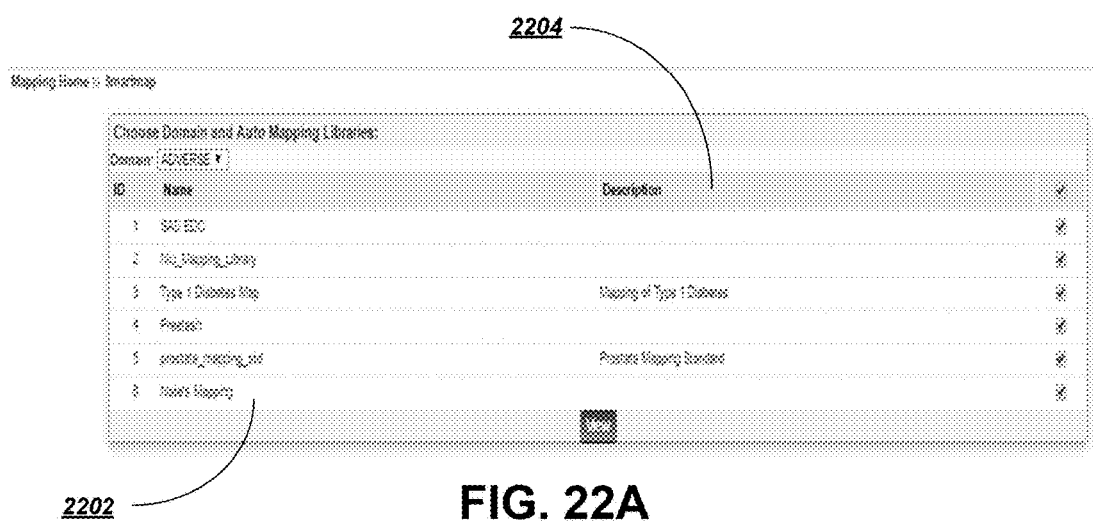
FIGS. 22A-22B depict exemplary interfaces for mapping variable names based on similarities in non-identical variable names.

FIGS. 22A-22B depict exemplary smart mapping interfaces for mapping variable names based on similarities in non-identical variable names. FIG. 22A depicts a scan interface akin to the automapping scan interface of FIG. 21A. This interface shows the name 2202 of the mapping libraries, and a description 2204 assigned to the named library. A checkbox allows a given library to be selected for application by smart mapping logic.

Figure 23:
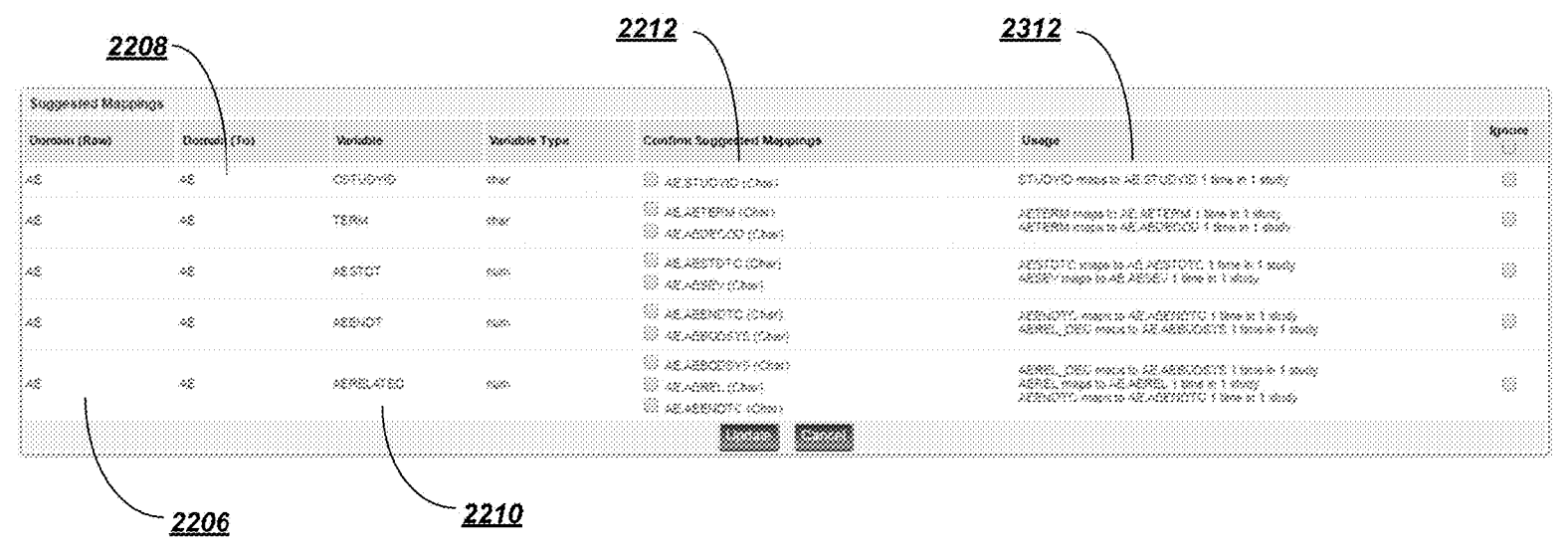

According to some embodiments, a user interface may be presented when uncertainty exists regarding the correct mapping (or this interface may be shown as a matter of course, to obtain user confirmation of the smart mappings to be applied). The interface may present two or more options for specified variable names from the specified domain to which the selected variable name may be mapped. A selection of one of the two or more options may be received, and the second mapping may be specified based on the selection. As shown in FIG. 22B, the confirmation interface may display the domain 2206 (e.g., table or data set name) of the source variable, and a target domain 2208 from the standard to which the domain 2206 should be mapped. Further, the interface displays a name of the source variable, and a suggested mapping 2212. Assuming a mapping rule was identified, the rule to be applied may be reflected in the suggested mapping field 2212 (see, e.g., FIG. 23) When multiple options are determined to be possible, a checkbox may allow a user to select one of the possible mappings to be applied. The interface may further include a description 2312 summarizing the mapping rule to be applied.

Figure 24A:
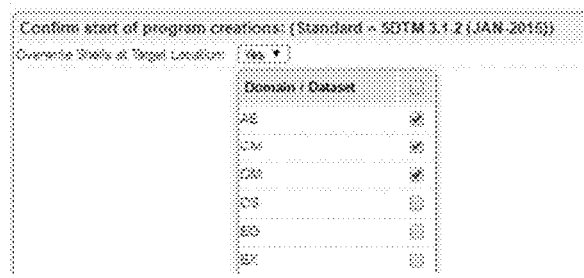
FIGS. 24A-24C depict exemplary interfaces for generating program templates.
Figure 24B:
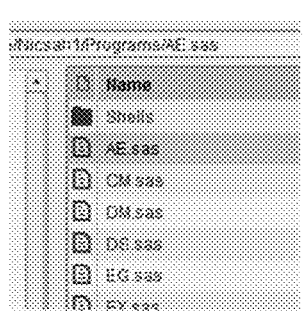
Figure 24C:
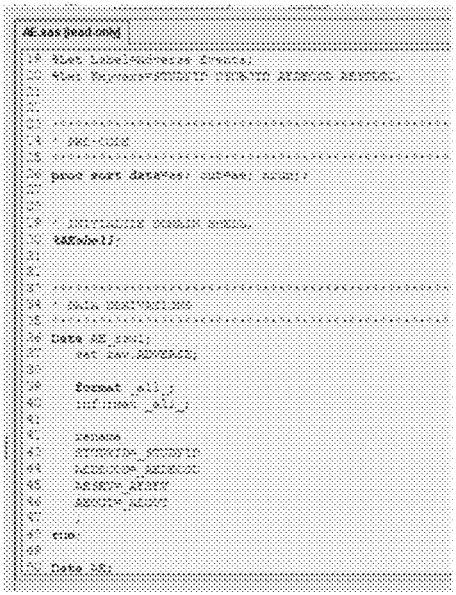

Returning to FIG. 13C, at block 1366 code may (optionally) be automatically generated for programmatically applying the mapping rule to a new data set. The code may be generated by defining a script that replaces the selected data variable name with the specified domain variable name. For instance, FIGS. 24A-24C depict exemplary interfaces for generating program templates. As shown in FIG. 24A, the datasets for which mapping rules are to be generated may be selected. FIG. 24B shows a selection of existing or newly generated program shells 2402 that correspond to the datasets selected in FIG. 24A. Based on the rules previously generated, one or more scripts (FIG. 24C) applying the mapping rules to replace the source variable name with the destination variable name as specified in the rule.

Figure 14:
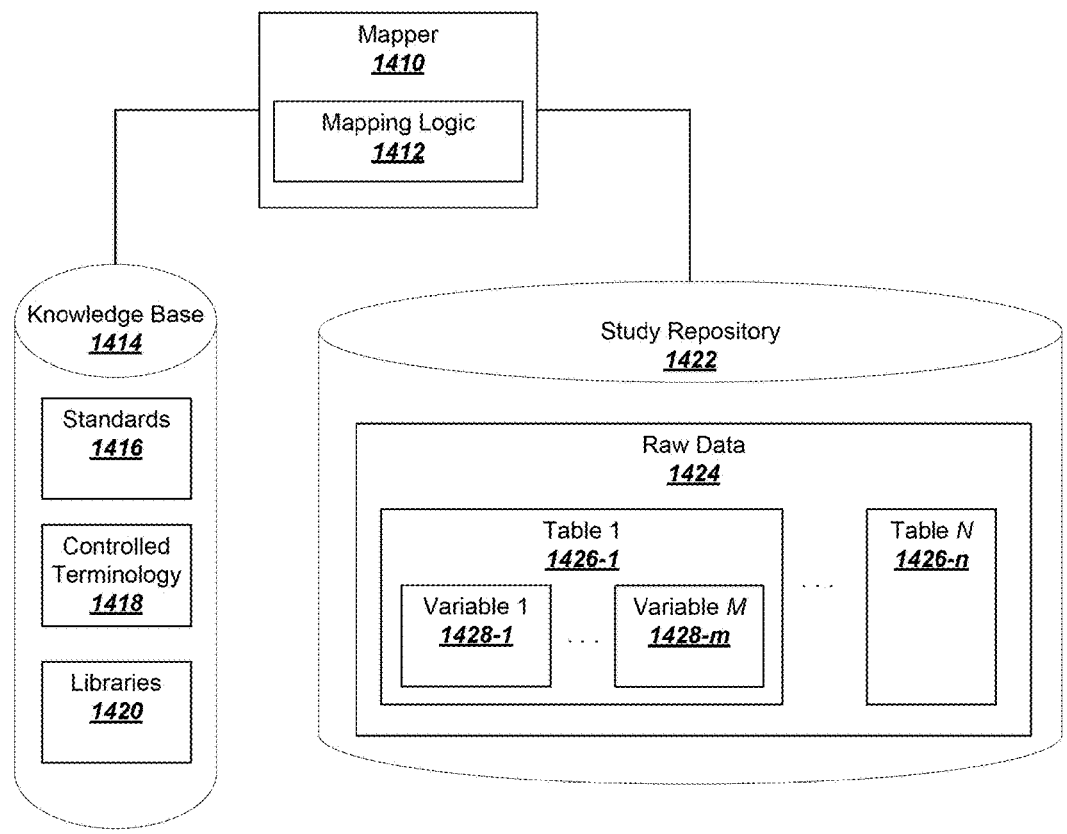
FIG. 14 depicts an exemplary system in which variable names may be matched to a standard.

FIG. 14 depicts an exemplary system in which variable names may be matched to a standard. A mapper 1410 may apply mapping logic 1412, such as the logic described above in connection with FIG. 13C. The mapper 1410 may be an electronic computing device dedicated to applying the mapping logic 1412, or may be a system including a program, application, or other capabilities for applying the mapping logic 1412.

The mapper 1410 may interact with a knowledge base 1414 and a study repository 1422. The knowledge base 1414 may store information used by the mapping logic 1412 to determine how best to map variable names to standards 1416 and/or controlled terminology 1418. To this end, the knowledge base 1414 may store the above-described libraries 1420 that include mapping rules.

The study repository 1422 may include user-submitted data that the user requests to have standardized according to one or more of the standards 1416 and/or controlled terminology 1418. The study repository 1422 may store raw data 1424, which may consist of one or more tables 1426-$i$. Each table 1426-$i$ may have a table name, which may correspond to a name of a domain in one or more of the standards 1416. The tables 1426-$i$ may store values for one or more variables 1428-$i$. Each table 1426-$i$ may store related groups of variables 1428-$i$ as may be found in a domain of the standards 1416. The variables 1428-$i$ may have names which correspond to variable names in the standards 1416.

Advantageously, by using the mapping logic to initially define mapping rules in the libraries 1420, and then to subsequently apply the rules to new data 1424 as the data is submitted, variable naming can be made more consistent and efficient. Because this procedure is objective and methodical, it provides repeatability and consistency that may not occur when mapping is performed manually by various programmers performing the same task. The use of machine learning, as described herein, reduces the burdens associated with manual mapping of source data variables by learning the most appropriate mappings and then automatically performing these mappings to future observations based on historical precedent. Machine learning further ensures faster quality deliverables across a range of raw data sources that the learning technology evaluates As described above, some embodiments may reference the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer-readable medium storing instructions that, when executed by one or more processors, cause the one or more processors to:
   receive an identification of a standard that defines one or more domains, the standard representing a collection of recommended names for domain variables pertaining to data associated with each respective domain;
   associate the standard with a collection of data, the collection of data comprising one or more tables, each of the one or more tables comprising one or more data variables having respective variable names;
   read the collection of data into a memory;
   canonicalize the collection of data, the canonicalizing comprising one or more of removing empty records, converting the collection of data to a same letter case, combining columns in the collection of data, or filtering categories in the collection of data to remove categories having observation counts below a predetermined minimum threshold;
   determine a first mapping of a selected table from the one or more tables to a specified domain of the one or more domains, and determining a second mapping of a selected data variable name within the selected table to a specified domain variable name within the specified domain, wherein determining the first mapping and the second mapping comprises:
      analyzing a name of the selected table and the selected data variable name to generate a plurality of n-grams of the selected table name and the selected data variable name,
      storing the plurality of n-grams in a dictionary,
      performing an analysis on the plurality of n-grams to re-scale the dictionary,
      evaluating a plurality of models to determine which of the plurality of models produces a highest weighted accuracy in mapping terms of the dictionary to terms of the standard,
      selecting one of the plurality of models based on the weighted accuracy, and
      identifying the first mapping and the second mapping in the selected model;
   defining a mapping rule based on the first mapping and the second mapping;
   receive a new data set comprising one or more new tables, the one or more new tables each comprising one or more new data variables having respective new variable names; and
   use the mapping rule to predict that a selected one of the new data variables should be mapped to the specified domain variable name within the specified domain based at least in part on: the new variable name of the selected one of the new data variables being identical to the selected domain variable name, or the new variable name matching the selected domain variable name within a predetermined threshold closeness value.

2. The medium of claim 1, further storing instructions for:
   storing the mapping rule as metadata in a library; and
   accessing mapping rules in the library when predicting that the selected one of the new variables should be mapped to the specified variable name within the specified domain.

3. The medium of claim 1, further storing instructions for displaying an auto mapping interface, the auto mapping interface displaying the respective variable name, the name of the selected table, the specified domain variable name, and the specified domain, and a selection element that, upon selection, confirms that the mapping rule applying the first mapping and the second mapping should be applied to the respective variable name and the name of the selected table.

4. The medium of claim 1, wherein the analysis of the plurality of n-grams is a term-frequency/inverse-document-frequency (TF-IDF) analysis, and the n-gram analysis applies a value of n=2.

5. The medium of claim 1, wherein the weighted accuracy is determined by:
   determining a mapping defined by the selected model, the mapping matching a variable name of the model to the selected data variable name;

determining, based on the n-gram analysis, a mapping score that describes how closely the variable name of the model matches the selected data variable name;

determining a number of studies using the mapping; and weighing the mapping score based on the number of studies.

6. The medium of claim 1, further storing instructions for automatically generating code for programmatically applying the mapping rule to the new data set, the automatically generating comprising defining a script that replaces the selected data variable name with the specified domain variable name.

7. The medium of claim 1, wherein the mapping rule is created by a first user, and further storing instructions for:
receiving the new collection of data from a second user; and
automatically applying the mapping rule to map data in the new collection to the standard when one or more variable names in the new collection exactly match one or more variable names defined in the mapping rule.

8. The medium of claim 1, wherein at least one of the new variable names is distinct from a variable name defined in the mapping rule, and further storing instructions for:
determining a degree of similarity between the new variable name and the variable name defined in the mapping rule; and
applying the mapping rule to the new variable name based on the determined degree of similarity.

9. The medium of claim 1, wherein at least one of the new variable names is distinct from a variable name defined in the mapping rule, and further storing instructions for:
determining a frequency with which the mapping rule has been applied to map the new variable name to the variable name defined in the mapping rule; and
applying the mapping rule to the new variable name based on the determined frequency.

10. The medium of claim 1, further storing instructions for presenting a user interface, the user interface configured to:
present two or more options for specified variable names from the specified domain to which the selected variable name may be mapped;
receive a selection of one of the two or more options; and
specify the second mapping based on the selection.

11. A method performed by an electronic device, the method comprising:
receiving an identification of a standard that defines one or more domains, the standard representing a collection of recommended names for domain variables pertaining to data associated with each respective domain;
associating the standard with a collection of data, the collection of data comprising one or more tables, each of the one or more tables comprising one or more data variables having respective variable names;
reading the collection of data into a memory;
canonicalizing the collection of data, the canonicalizing comprising one or more of removing empty records, converting the collection of data to a same letter case, combining columns in the collection of data, or filtering categories in the collection of data to remove categories having observation counts below a predetermined minimum threshold;
determining a first mapping of a selected table from the one or more tables to a specified domain of the one or more domains, and determining a second mapping of a selected data variable name within the selected table to a specified domain variable name within the specified domain, wherein determining the first mapping and the second mapping comprises:
analyzing a name of the selected table and the selected data variable name to generate a plurality of n-grams of the selected table name and the selected data variable name,
storing the plurality of n-grams in a dictionary,
performing an analysis on the plurality of n-grams to re-scale the dictionary,
evaluating a plurality of models to determine which of the plurality of models produces a highest weighted accuracy in mapping terms of the dictionary to terms of the standard,
selecting one of the plurality of models based on the weighted accuracy, and
identifying the first mapping and the second mapping in the selected model;
defining a mapping rule based on the first mapping and the second mapping;
receiving a new data set comprising one or more new tables, the one or more new tables each comprising one or more new data variables having respective new variable names; and
using the mapping rule to predict that a selected one of the new data variables should be mapped to the specified domain variable name within the specified domain based at least in part on: the new variable name of the selected one of the new data variables being identical to the selected domain variable name, or the new variable name matching the selected domain variable name within a predetermined threshold closeness value.

12. The method of claim 11, further comprising:
storing the mapping rule as metadata in a library; and
accessing mapping rules in the library when predicting that the selected one of the new variables should be mapped to the specified variable name within the specified domain.

13. The method of claim 11, further storing instructions for displaying an auto mapping interface, the auto mapping interface displaying the respective variable name, the name of the selected table, the specified domain variable name, and the specified domain, and a selection element that, upon selection, confirms that the mapping rule applying the first mapping and the second mapping should be applied to the respective variable name and the name of the selected table.

14. The method of claim 11, wherein the analysis of the plurality of n-grams is a term-frequency/inverse-document-frequency (TF-IDF) analysis, and the n-gram analysis applies a value of n=2.

15. The method of claim 11, wherein the weighted accuracy is determined by:
determining a mapping defined by the selected model, the mapping matching a variable name of the model to the selected data variable name;
determining, based on the n-gram analysis, a mapping score that describes how closely the variable name of the model matches the selected data variable name;
determining a number of studies using the mapping; and
weighing the mapping score based on the number of studies.

16. The method of claim 11, further comprising automatically generating code for programmatically applying the mapping rule to the new data set, the automatically generating comprising defining a script that replaces the selected data variable name with the specified domain variable name.

17. The method of claim 11, wherein the mapping rule is created by a first user, and further comprising:

receiving the new collection of data from a second user; and automatically applying the mapping rule to map data in the new collection to the standard when one or more variable names in the new collection exactly match one or more variable names defined in the mapping rule.

18. The method of claim 11, wherein at least one of the new variable names is distinct from a variable name defined in the mapping rule, and further comprising:

determining a degree of similarity between the new variable name and the variable name defined in the mapping rule; and applying the mapping rule to the new variable name based on the determined degree of similarity.

19. The method of claim 11, wherein at least one of the new variable names is distinct from a variable name defined in the mapping rule, and further comprising:

determining a frequency with which the mapping rule has been applied to map the new variable name to the variable name defined in the mapping rule; and applying the mapping rule to the new variable name based on the determined frequency.

20. The method of claim 11, further comprising presenting a user interface, the user interface configured to:

present two or more options for specified variable names from the specified domain to which the selected variable name may be mapped;

receive a selection of one of the two or more options; and specify the second mapping based on the selection.

21. An apparatus comprising:

a hardware processor circuit;

an interface executable on the processor circuit and configured to receive an identification of a standard that defines one or more domains, the standard representing a collection of recommended names for domain variables pertaining to data associated with each respective domain;

association logic executable on the processor circuit and configured to associate the standard with a collection of data, the collection of data comprising one or more tables, each of the one or more tables comprising one or more data variables having respective variable names;

storage logic executable on the processor circuit and configured to read the collection of data into a memory;

canonicalization logic executable on the processor circuit and configured to canonicalize the collection of data, the canonicalizing comprising one or more of removing empty records, converting the collection of data to a same letter case, combining columns in the collection of data, or filtering categories in the collection of data to remove categories having observation counts below a predetermined minimum threshold; and mapping logic executable on the processor circuit and configured to determine a first mapping of a selected table from the one or more tables to a specified domain of the one or more domains, and determining a second mapping of a selected data variable name within the selected table to a specified domain variable name within the specified domain, wherein determining the first mapping and the second mapping comprises:

analyzing a name of the selected table and the selected data variable name to generate a plurality of n-grams of the selected table name and the selected data variable name, storing the plurality of n-grams in a dictionary, performing an analysis on the plurality of n-grams to re-scale the dictionary, evaluating a plurality of models to determine which of the plurality of models produces a highest weighted accuracy in mapping terms of the dictionary to terms of the standard, selecting one of the plurality of models based on the weighted accuracy, and identifying the first mapping and the second mapping in the selected model, wherein:

the interface is further configured to receive a new data set comprising one or more new tables, the one or more new tables each comprising one or more new data variables having respective new variable names, and the mapping logic is further configured to defining a mapping rule based on the first mapping and the second mapping, and to use the mapping rule to predict that a selected one of the new data variables should be mapped to the specified domain variable name within the specified domain based at least in part on: the new variable name of the selected one of the new data variables being identical to the selected domain variable name, or the new variable name matching the selected domain variable name within a predetermined threshold closeness value.

22. The apparatus of claim 21, wherein the storage logic is further configured to store the mapping rule as metadata in a library, and the mapping logic is further configured to access mapping rules in the library when predicting that the selected one of the new variables should be mapped to the specified variable name within the specified domain.

23. The apparatus of claim 21, further storing instructions for displaying an auto mapping interface, the auto mapping interface displaying the respective variable name, the name of the selected table, the specified domain variable name, and the specified domain, and a selection element that, upon selection, confirms that the mapping rule applying the first mapping and the second mapping should be applied to the respective variable name and the name of the selected table.

24. The apparatus of claim 21, wherein the analysis of the plurality of n-grams is a term-frequency/inverse-document-frequency (TF-IDF) analysis, and the n-gram analysis applies a value of n=2.

25. The apparatus of claim 21, wherein the weighted accuracy is determined by:

determining a mapping defined by the selected model, the mapping matching a variable name of the model to the selected data variable name;

determining, based on the n-gram analysis, a mapping score that describes how closely the variable name of the model matches the selected data variable name;

determining a number of studies using the mapping; and weighing the mapping score based on the number of studies.

26. The apparatus of claim 21, further comprising code generation logic executable on the processor circuit and configured to automatically generate code for programmatically applying the mapping rule to the new data set, the automatically generating comprising defining a script that replaces the selected data variable name with the specified domain variable name.

27. The apparatus of claim 21, wherein the mapping rule is created by a first user, and wherein:

the interface logic is further configured to receive the new collection of data from a second user; and the mapping logic is further configured to automatically apply the mapping rule to map data in the new collection to the standard when one or more variable names in the new collection exactly match one or more variable names defined in the mapping rule.

28. The apparatus of claim 21, wherein at least one of the new variable names is distinct from a variable name defined in the mapping rule, and the mapping logic is further configured to:
   determine a degree of similarity between the new variable name and the variable name defined in the mapping rule; and
   apply the mapping rule to the new variable name based on the determined degree of similarity.

29. The apparatus of claim 21, wherein at least one of the new variable names is distinct from a variable name defined in the mapping rule, and the mapping logic is further configured to:
   determine a frequency with which the mapping rule has been applied to map the new variable name to the variable name defined in the mapping rule; and
   apply the mapping rule to the new variable name based on the determined frequency.

30. The apparatus of claim 21, further comprising user interface logic configured to display a user interface on a display device, the user interface configured to:
   present two or more options for specified variable names from the specified domain to which the selected variable name may be mapped;
   receive a selection of one of the two or more options; and
   specify the second mapping based on the selection.

* * * * *